United States Patent [19]

Nakagawa

[11] Patent Number: 4,516,643

[45] Date of Patent: May 14, 1985

[54] COMBINATORIAL WEIGHING METHOD AND APPARATUS

[75] Inventor: Yukio Nakagawa, Kyoto, Japan

[73] Assignee: Kabushiki Kaisha Ishida Koki Seisakusho, Kyoto, Japan

[21] Appl. No.: 506,796

[22] Filed: Jun. 22, 1983

[30] Foreign Application Priority Data

Jun. 23, 1982 [JP] Japan .............................. 57-107790
Dec. 11, 1982 [JP] Japan .............................. 57-217581

[51] Int. Cl.³ .................... G01G 9/00; G01G 19/22; G01G 19/413; G01G 19/417
[52] U.S. Cl. ...................................... 177/1; 177/25; 177/50
[58] Field of Search ............... 177/1, 25, 50, DIG. 12

[56] References Cited

U.S. PATENT DOCUMENTS

| | | | |
|---|---|---|---|
| 3,974,888 | 8/1976 | Murakami et al. | 177/1 X |
| 4,341,274 | 7/1982 | Hirano et al. | 177/25 |
| 4,397,364 | 8/1983 | Hirano | 177/25 |
| 4,416,341 | 11/1983 | Hirano | 177/1 X |

Primary Examiner—E. A. Goldberg
Assistant Examiner—Patrick W. Foster
Attorney, Agent, or Firm—Staas & Halsey

[57] ABSTRACT

A combinatorial weighing method and apparatus in which weight data from N-number of weighing machines containing articles are combined to obtain an optimum combination of weighing machines giving a total combined weight value of articles equal to a preset value Wa or closet to the preset value Wa within preset allowable limits, and in which the articles are discharged from the obtained optimum combination of weighing machines. The method includes starting combinations with i as the initial number of weighing machines in each combination, wherein i represents the number of weighing machines which tends to afford the optimum combination more readily than other numbers of the weighing machines. Combinations which select the i-number of weighing machines from the N-number of weighing machines, are generated continuously and it is determined whether the total weight value of each combination machine falls within the preset allowable limits. A combination which is within the preset allowable limits is stored, and articles are discharged based on the stored optimum combination. The initial value of i is set to N/2 when N is even, to (N/2)±0.5 when N is odd, or to a value obtained by performing the following operation:

$$Wa / \left( \sum_{i=1}^{N} Wi/N \right),$$

where Wi (i=1, 2, . . . , N) represents the weight of article batches supplied to each of the weighing machines. For each total weight value of a certain combination that is obtained, the value is ranked as being underweight, proper or overweight, the weight values are counted rank by rank, and the quantity of articles suppled to the weighing hoppers is controlled based on the counted value in each rank. When an optimum combination is not found with the initial number of weighing machines, i is updated based on the counted value in each rank, and processing for selection of an optimum combination is re-executed.

17 Claims, 27 Drawing Figures

```
12f            -[0|0|0|0|1|0|0|0|0]
12a-1          -[0|0|0|0|0|0|0|0|1]
12a-2          -[0|0|0|0|0|0|0|1|0]
12a-3          -[0|0|0|0|0|0|1|0|0]
12a-4          -[0|0|0|0|0|1|0|0|0]
12a-5          -[0|0|0|0|1|0|0|0|0]
Output CBP     [0|0|0|0|1|1|1|1|1]
from Gate 12e
```

```
(F)   [0|0|0|0|1|0|0|0|0] - 12f
      [0|0|0|0|1|1|1|1|1] - CBP (G)   [0|0|0|1|0|0|0|0|0] - 12f
      [0|0|0|1|0|1|1|1|1] - CBP (H)   [0|0|1|0|0|0|0|0|0] - 12f
      [0|0|1|0|0|1|1|1|1] - CBP (I)   [0|1|0|0|0|0|0|0|0] - 12f
      [0|1|0|0|0|0|1|1|1] - CBP (J)   [1|0|0|0|0|0|0|0|0] - 12f
      [1|0|0|0|0|0|1|1|1] - CBP
```

12f — 0 0 0 0 1 0 0 0 0
12a-1 — 0 0 0 0 0 0 0 0 1
12a-2 — 0 0 0 0 0 0 0 1 0
12a-3 — 0 0 0 0 0 0 1 0 0
12a-4 — 0 0 0 0 0 1 0 0 0
12a-5 — 0 0 0 0 1 0 0 0 0
CBP — 0 0 0 0 1 1 0 1 1 1

(N) { 0 0 0 1 0 0 0 0 0 — 12f
     0 0 0 1 0 1 0 1 1 1 — CBS (O) { 0 0 1 0 0 0 0 0 0 — 12f
     0 0 1 0 0 1 0 1 1 1 — CBS (P) { 0 1 0 0 0 0 0 0 0 — 12f
     0 1 0 0 0 1 0 1 1 1 — CBS (Q) { 1 0 0 0 0 0 0 0 0 — 12f
     1 0 0 0 0 1 0 1 1 1 — CBS

Fig. 7 (R)

| | | | | | | | | | |
|---|---|---|---|---|---|---|---|---|---|
| 12f | 0 | 0 | 0 | 0 | 0 | 1 | 0 | 0 | 0 |
| 12a-1 | 0 | 0 | 0 | 0 | 0 | 0 | 0 | 0 | 1 |
| 12a-2 | 0 | 0 | 0 | 0 | 0 | 0 | 0 | 1 | 0 |
| 12a-3 | 0 | 0 | 0 | 0 | 0 | 0 | 1 | 0 | 0 |
| 12a-4 | 0 | 0 | 0 | 0 | 1 | 0 | 0 | 0 | 0 |
| 12a-5 | | | | | | | | | |

Fig. 7 (S)

| | | | | | | | | | |
|---|---|---|---|---|---|---|---|---|---|
| 12f | 0 | 0 | 0 | 0 | 1 | 0 | 0 | 0 | 0 |
| 12a-1 | 0 | 0 | 0 | 0 | 0 | 0 | 0 | 0 | 1 |
| 12a-2 | 0 | 0 | 0 | 0 | 0 | 0 | 0 | 1 | 0 |
| 12a-3 | 0 | 0 | 0 | 0 | 0 | 0 | 1 | 0 | 0 |
| 12a-4 | 0 | 0 | 0 | 0 | 1 | 0 | 0 | 0 | 0 |
| 12a-5 | | | | | | | | | |

Fig. 7 (T)

| | | | | | | | | | |
|---|---|---|---|---|---|---|---|---|---|
| 12f | 0 | 0 | 0 | 1 | 0 | 0 | 0 | 0 | 0 |
| 12a-1 | 0 | 0 | 0 | 0 | 0 | 0 | 0 | 0 | 1 |
| 12a-2 | 0 | 0 | 0 | 0 | 0 | 0 | 0 | 1 | 0 |
| 12a-3 | 0 | 0 | 0 | 0 | 0 | 0 | 1 | 0 | 0 |
| 12a-4 | 0 | 0 | 0 | 0 | 1 | 0 | 0 | 0 | 0 |
| 12a-5 | 0 | 0 | 1 | 0 | 0 | 0 | 0 | 0 | 0 |
| CBS | 0 | 0 | 0 | 1 | 1 | 0 | 1 | 1 | 1 |

(U) 
- 0 0 1 0 0 0 0 0 0
- 0 0 1 0 1 0 0 1 1 1 — CBS (V)
- 0 1 0 0 0 0 0 0 0
- 0 1 0 0 1 0 0 1 1 1 — CBS (W)
- 1 0 0 0 0 0 0 0 0
- 1 0 0 0 1 0 0 1 1 1 — CBS (X) 0 0 1 1 0 0 0 1 1 1
(Y) 0 1 0 1 0 0 0 1 1 1
(Z) 1 0 0 1 0 0 0 1 1 1
(A') 0 1 1 0 0 0 0 1 1 1
(B') 1 0 1 0 0 0 0 1 1 1
(C') 1 1 0 0 0 0 0 1 1 1

COMBINATORIAL WEIGHING METHOD AND APPARATUS

CROSS-REFERENCE TO RELATED APPLICATIONS

This application is related to U.S. application Ser. No. 445,013 filed Nov. 29, 1982 and U.S. application Ser. No. 459,940 filed Jan. 21, 1983, both of which are assigned to the Assignee of the subject application.

BACKGROUND OF THE INVENTION

This invention relates to a combinatorial weighing system and, more particularly, to a combinatorial weighing method and apparatus through which it is possible to select, in a short period of time, a combination of articles having a total combined weight value within preset allowable limits and closest to a preset weight value.

A combinatorial weighing apparatus has a plurality of weighing machines each consisting of a weighing hopper and a weight sensor associated with the weighing hopper. According to a known combinatorial weighing method using the aforesaid apparatus, combinatorial weighing is carried out by weighing articles which have been introduced into the weighing hoppers of the weighing machines, selecting the combination of weighing machines (referred to as the "optimum" combination) that gives a total weight value equal to a preset value or closest to the preset value within preset allowable limits, discharging only those articles contained by the weighing hoppers of the selected weighing machines, and subsequently replenishing the emptied weighing hoppers with new articles to prepare for the next weighing cycle. The foregoing sequence of steps is repeated to carry out a continuous, highly accurate weighing operation automatically.

FIGS. 1 and 2 illustrate a combinatorial weighing apparatus for practicing the above-described weighing method. FIG. 1 shows the apparatus in diagrammatic form, and FIG. 2 is a block diagram of a combination control unit.

Referring to FIG. 1, numeral 1 denotes a main feeder of vibratory conveyance type. Articles to be weighed are introduced into the main feeder 1 and imparted with vibratory motion for a predetermined length of time so as to be dispersed radially outward from the center of the main feeder. Numerals 2, 2 ... denote n-number of weighing stations which are arranged around the main feeder 1 along radially extending lines to receive the articles dispersed by the main feeder. Each weighing station 2 includes a dispersing feeder 2a, a pool hopper 2b, a pool hopper gate 2c, a weighing hopper 2d, a weight sensor 2e, and a weighing hopper gate 2f. The dispersing feeder 2a comprises an independently vibratable conveyance device for feeding the articles by means of vibration, or an independently operable shutter. In either case, each dispersing feeder 2a is so arranged that the articles received from the centrally located main feeder 1 can be introduced into the corresponding pool hopper 2b disposed below each dispersing feeder 2a. The pool hopper gate 2c is provided on each pool hopper 2b in such a manner that the articles received in the pool hopper 2b are released into the weighing hopper 2d when the pool hopper gate 2c is opened. Each weighing machine is composed of with an attached weighing hopper 2d and a weight sensor 2e. The weight sensor 2e is operable to measure the weight of the articles introduced into the weighing hopper 2d of the weighing machine, and to apply an electrical signal indicative of the measured weight to the combination control unit 5 shown in FIG. 2. The combination control unit then selects the combination of articles (the "optimum" combination) which gives a total weight equal to a preset value or closest to the preset value within preset allowable limits, as will be described below in further detail. Each weighing hopper 2d is provided with its own weighing hopper gate 2f. A drive controller, shown in FIG. 2, upon receiving the signals from each of the weight sensors, produces a signal to open only the weighing hopper gates 2f of those weighing hoppers 2d that give the optimum combination, these gates 2f discharging the articles from the corresponding weighing hoppers 2d into a common chute 3 where they are collected together. The collecting chute 3 has the shape of a funnel and is so arranged as to receive the articles from any of the circularly arrayed weighing hoppers 2d via the hopper gates 2f, which are located above the funnel substantially along its outer rim. The articles received by the collecting chute 3 are collected at the centrally located lower end of the chute 3 by falling under their own weight or by being forcibly shifted along the inclined wall of the funnel by a mechanical scraper or the like (not shown). The collecting chute 3 is provided with a timing hopper 4 at the lower end of chute 3 for temporarily holding the collected articles. The arrival of an externally applied release signal from a packaging machine or the like causes the timing hopper 4 to release the retained articles from the system.

Reference will now be had to the block diagram of FIG. 2 for a description of one example of the combination control unit. The combination control unit 5 includes an n-bit (n=10) counter 5a for counting timing pulses TP of a predetermined frequency, and for generating all combinations of n-number of the weighing hoppers. These combinations will also be referred to as "combination patterns" where appropriate. Specifically, for n-number of weighing hoppers, n combinations are possible when each combination is composed of one weighing hopper from the total of n weighing hoppers, n(n−1)/2! combinations are possible wehn each combination is composed of two weighing hoppers selected from said total, and, in general, n(n−1) (n−2) ... (n−r+1)/r! combinations are possible when each combination is composed of r-number of weighing hoppers selected from said total of n weighing hoppers. Accordingly, when the n-bit binary counter 5a has counted $2^n-1$ timing pulses TP, a total of $2^n-1$ different bit patterns, from 000 ... 001 to 111 ... 111, will have been generated. Therefore, if correspondence is established between the first bit and the first weighing hopper, between the second bit and the second weighing hopper, and between third through n-th bits and the third through n-th weighing hoppers, then the generated bit pattern will be an indication of the above-mentioned combination pattern.

A multiplexer 5b, in accordance with the output bit pattern of the counter 5a, provides an arithmetic unit 5f with weight values (indicative of the weight of the article batches) from the weight sensors 2e of weighing hoppers designated by the bit pattern of the counted value in counter 5a. For instance, if the value of the count (the bit pattern) in counter 5a is 1000101011 when n=10, then the arithmetic unit 5f will receive, as inputs, the weight value outputs W1, W2, W4, W6, W10 from the weight sensors 2e attached to the first, second, fourth, sixth and tenth weighing machines, respectively. A register 5c is provided for storing a preset value Wa. Numerals 5d, 5e denote upper and lower limit setting devices, respectively, for storing preset allowable limits (namely an upper limit or maximum value Ma, and a lower limit or minimum value Mi, respectively) which are desirable for weight values. The minimum value Mi is set equal to the target value, as is customary. If it were set lower than the target value, the result could be delivery of articles having a total weight less than that intended, and complaints might ensue.

The arithmetic unit 5f computes, and delivers a signal indicative of, the total weight $\Sigma$ Wi $(=X)$ of the weight values received from the multiplexer, and also computes the difference between the total weight $\Sigma$ Wi and the preset value Wa. The arithmetic unit 5f produces a signal A indicting the absolute value of the computed difference. More specifically, the arithmetic unit 5a performs the operations:

$$\Sigma Wi = X \qquad (1)$$

$$|\Sigma Wi - Wa| = A \qquad (2)$$

and produces a signal representing the total weight $\Sigma$ Wi $(=X)$, as well as a signal A representing the absolute value (hereafter referred to simply as the "deviation") of the difference between the total weight $\Sigma$ Wi and the preset value Wa. The value X is applied to a comparator 5g, whose output is connected to a proper weight counter 5h. The comparator 5g discriminates whether the total weight value X lies in the range defined by Mi and Ma. Specifically, if the following relation holds:

$$Mi \leq X \leq Ma \qquad (3)$$

then the comparator 5g will increment (count up) the counter 5h by one. A minimum deviation register 5j for storing the minimum deviation is set automatically to the deviation A the first time only, and thereafter is updated as the conditions warrant, as will be described later. In the case where the minimum value Mi is set equal to the preset value, it is permissible to initially set the minimum deviation register 5j to the difference between the maximum value Ma and the preset value. An optimum combination memory 5k is adapted to store the optimum combination pattern. Numerals 5m and 5n denote gates. When the total weight value $\Sigma$ W$_i$ is within the preset allowable limits, a comparator 5p compares the deviation value A, namely the output of the arithmetic unit 5f, with the prevailing minimum deviation value, denoted by B, stored in the minimum deviation register 5j. When the inequality A < B holds, the output of comparator 5p is such that the deviation value A is delivered for storage to the minimum deviation register 5j through the gate 5m, and the content (combination pattern) of counter 5a is delivered for storage to the optimum combination memory 5k.

When the state of counter 5h is one or more, the drive controller 6, which receives a signal from memory 5k indicative of the optimum combination pattern, is operable to open the weighing hopper gates 2f (FIG. 1) specified by the optimum combination pattern, so that the corresponding weighing hoppers discharge their articles into the collecting chute 3, and to open the corresponding pool hopper gates 2c so that the emptied weighing hoppers may be replenished with articles.

The operation of the weighing apparatus will now be described. At the start of operation, each of the pool hoppers 2b and each of the weighing hoppers 2d contain a supply of articles. The weight sensors 2e provided on corresponding ones of the weighing hoppers 2d measure the weights of the articles and produce weight values W1 through W10 which are sent to the multiplexer 5b. The n-bit (n=10) counter 5a counts the timing pulses TP having the predetermined frequency to produce $2^n - 1$ combination patterns. Thus, when the first timing pulse TP arrives and is counted, the state of counter 5a becomes 0000000001. As a result, the multiplexer 5b sends the first weight value signal W1, from the weight sensor 2e provided on the first weighing hopper 2d, to the arithmetic circuit 5f, which responds by performing the operations specified by equations (1) and (2) above, thereby producing the signals indicative of the total weight $\Sigma$ W$_i$ of the combination and of the deviation $A$ $(=|W1 - Wa|)$ between $\Sigma$ Wi and the preset value Wa. Since the gates 5n, 5m will be open for the initial combinatorial computation, the deviation value A is transferred to and stored in the minimum deviation register 5j, and the content (the combination pattern 0000000001) of n-bit counter 5a is stored in the optimum combination memory 5k. Comparator 5g compares the total weight $\Sigma$ Wi $(=X)$ against the maximum value Ma and the minimum value Mi, and increments the counter 5h when the relation $M_i \leq X \leq M_a$ holds. Thenceforth, when the second timing pulse TP is generated, the pulse is counted by counter 5a, whose state (combination pattern) is incremented to 0000000010. Consequently, the weight value output W2 of the weight sensor 2e provided on the second weighing hopper is delivered to the arithmetic unit 5f which then performs the operations of equations (1) and (2) to produce the signals indicative of the total weight $\Sigma$ Wi $(=X)$ and of the deviation value A $(A = |W2 - Wa|)$. The comparator 5g then determines whether relation (3) is satisfied; if it is, then the state of the proper weight counter 5h is incremented by one. The comparator 5p, meanwhile, compares the deviation value A with the state $B$ $(= |W1 - Wa|)$ of the minimum deviation register 5j. If the relation $A \geq B$ holds, then neither the register 5j nor the optimum combination memory 5k is updated; if $A \leq B$ holds, the deviation value A is transferred to and stored in register 5j, and the state of counter 5a is transferred to and stored in the optimum combination memory 5k. The operation described above is repeated until all $2^n - 1$ combinations have been generated. At such time the content of the minimum deviation register 5j will be the minimum deviation value obtained from the $2^n - 1$ combinations, and the content of the optimum combination memory 5k will be the combination pattern that gave said minimum value. The optimum combination is thus selected from the total of $2^n - 1$ possible combination patters.

If the value of the count in counter 5h is one or more, the drive controller 5k opens the weighing hopper gates 2f of weighing machines corresponding to the "1" bits of the input combination pattern (namely the optimum combination pattern), whereby the articles in these weighing hoppers 2d constituting the optimum combination are discharged into the collecting chute 3, after which the drive controller 5k opens the corresponding pool hopper gates 2c to replenish the emptied weighing hoppers 2d with articles. Further, the dispersing feeders 2a corresponding to the emptied pool hoppers are vibrated for a fixed length of time to resupply these pool hoppers with articles.

This completes one combinatorial weighing cycle, which may be repeated as often as required, to provide batches of the articles, each batch having a total weight equal or closest to the preset value. It should be noted that when the state of the proper weight counter 5h is zero in the foregoing operation, articles are not discharged and each of the weighing machines must be supplemented with articles to resume the combinatorial computations.

Thus, the combinatorial weighing method described above is extremely useful in obtaining a combination of weighing machines giving batches of articles having a total weight closest to a preset value within a preset allowable range, these article batches then being discharged from the system. However, a disadvantage with the above conventional method is that a considerable period of time is required for execution of the computations. The reason is that the combinatorial computations are performed covering all $2^n - 1$ possible combinations, that is, even those combinations which give a total weight far from the set value.

SUMMARY OF THE INVENTION

An object of the present invention is to provide a combinatorial weighing method and apparatus wherein it is not required that combinatorial computations be performed to cover all $2^n - 1$ combinations.

Another object of the present invention is to provide a combinatorial weighing method and apparatus making it possible to pick out an optimum combination of weighing machines with just a small number of combinatorial computations.

Still another object of the present invention is to provide a combinatorial weighing method and apparatus employing a novel combination pattern generating method capable of reducing the number of combinatorial computations.

A further object of the present invention is to provide a novel combinatorial weighing method and apparatus where, each time a total weight value is obtained by combinatorial computation, the value is ranked as being underweight, proper or overweight, and the weight values are counted rank by rank and the quantity of articles supplied to weighing machines is controlled based on the frequency at which the weight values appear in each rank. This method makes it possible to reduce the number of combinatorial computations.

According to the present invention, the foregoing objects are attained by providing a combinatorial weighing method and apparatus in which weight data from N-number of weighing machines containing articles are combined to obtain an optimum combination of weighing machines giving an optimum, total combined weight value of articles, and in which the articles are discharged from the optimum combination of weighing machines. The method includes starting combinations with i as the initial number of weighing machines, where the i-number of weighing machines in weighing machine combinations serves as a weighing machine number which tends to afford the optimum combination more readily than other numbers of the weighing machines, i being an integer less than N. Further steps include generating continuously only combinations which select the i-number of weighing machines from the N-number of weighing machines, determining whether the total weight value of ech combination composed of the i-number of weighing machines falls within preset allowable limits, storing a combination which is within the preset allowable limits, and discharging articles based on the stored combination when the combination is the optimum combination among all combinations composed of the i-number of weighing machines. When an optimum combination does not exist among the combinations composed of the i-number of weighing machines, the value of i is updated in accordance with the magnitudes of overweight and underweight counts, and combinations are recomputed based upon the updated value of i. The value of i continues to be updated and combinations computed until an optimum combination is found. Therefore, even if an optimum combination does not exist among the combinations which select the i-number of weighing machines for the initial value of i, it is still possible to quickly obtain an optimum combination among combinations composed of i-number of weighing machines for the updated value of i.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 7A-7T illustrates diagrams of bit patterns useful in understanding the operation of the present invention;

DESCRIPTION OF THE PREFERRED EMBODIMENT

Figure 1:
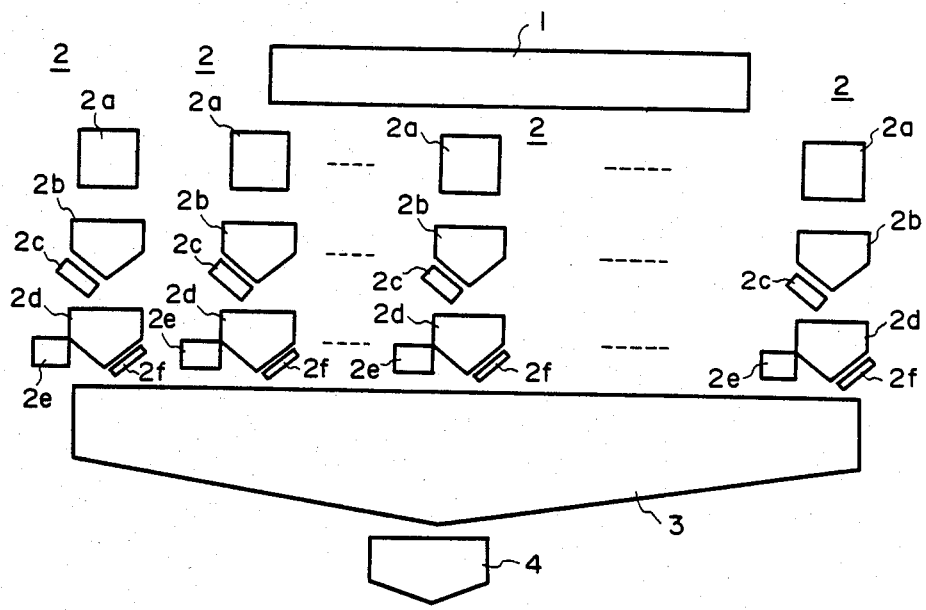
FIG. 1 is a schematic diagram of a combinatorial weighing apparatus for practicing a combinatorial weighing method according to the prior art.

The general features of a combinatorial weighing method according to the present invention will be described before discussing preferred embodiments of the invention in detail.

Let us examine a case where articles having a combined weight of X grams are to be weighed out in a combinatorial weighing apparatus having N-number of weighing machines. In other words, the preset value in this case will be X grams. To obtain the preset value, the amount of articles fed to each weighing machine should be adjusted to have an average value of 2X/N grams when N is even, and 2X/(N+1) or 2X/(N−1) grams when N is odd, with the reason that the number of combinations that can be computed by a combinatorial weighing apparatus composed of N weighing machines, where a combination may be made up of only one weighing machine or up to all N of the weighing machines, is $2^N-1$. When N is even, combinations composed of N/2 weighing machines will be the largest in number among the $2^N-1$ combinations. When N is odd, combinations composed of (N+1)/2 or of (N−1)/2 weighing machines will be the largest in number among the $2^N-1$ combinations. For example, when N=10, only ten combinations made up of one weighing machine each will exist, in contrast the number of combinations composed of five (i.e., N/2) weighing machines will be 252 in number. Accordingly, the weight of the articles fed into each weighing machine of the apparatus should be in the neighborhood of 1/(N/2) of the target value X, i.e., 2X/N. In a case where the weight values of the individual article batches are controlled in this manner, there is a very high probability that the sought combination (i.e., the "optimum" combination) will exist in the combinations composed of N/2 or (N±1)/2 weighing machines.

The present invention is based on the above fact that a combination giving a total weight value closest to the preset value will have a high probability of existing among the combinations which select N/2 weighing machines where N is even, or (N±1)/2 weighing machines where N is odd. According to the present invention, combination patterns are generated for a selected number of weighing machines or, more specifically, combinatorial computations are performed giving precedence to those combinations which select N/2 weighing machines where N is even, or (N±1)/2 weighing machines where N is odd, in this manner combinatorial computations can be reduced and processing capability enhanced. Further, according to the invention, a statistical distribution of combined weight values is obtained from the combinatorial computation process. The tendency of this distribution is monitored and the supply of articles to weighing machines is controlled, based on the observed tendency, in order to gather a large number of combined weight values, from combinations composed of N/2 weighing machines (where N is even) or (N±1)/2 weighing machines (where N is odd), which are in the vicinity of the preset value. This affords high accurate weighing which is continued in automatic fashion.

Figure 2:
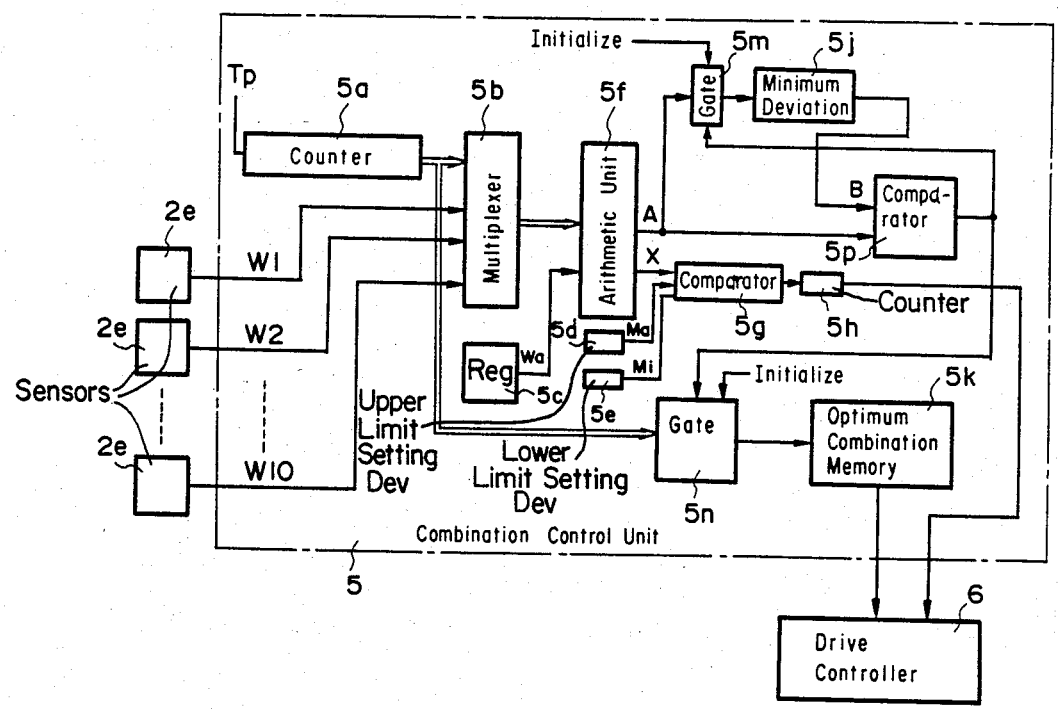
FIG. 2 is a block diagram of a combination control unit associated with the combinatorial weighing apparatus of FIG. 1.
Figure 3:
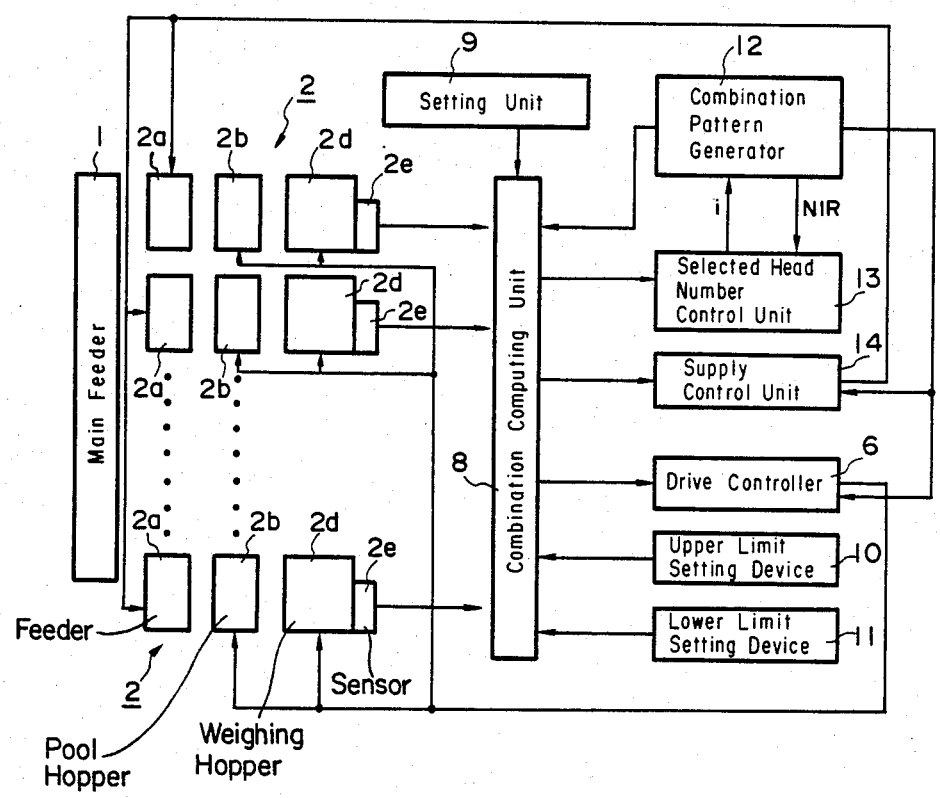
FIG. 3 is a simplified block diagram of an embodiment of a combinatorial weighing apparatus for practicing a combinatorial weighing method according to the present invention.

Reference will now be had to FIG. 3 to describe an apparatus for practicing the method of the present invention. Portions similar to those of the prior-art arrangement of FIG. 2 are designated by like reference characters.

The apparatus of FIG. 3 includes a combination pattern generator 12 which, in accordance with a signal i from a selected head number (weighing machine number) control unit 13 calling for the selection of i-number of weighing machines from a total of N weighing machines, produces a bit signal in which only the i-number of bits, from among the number N thereof, are raised to logical "1". The method through which this is accomplished will be described later. The value of i initially is the center value of the number N and is varied in accordance with the results of combinatorial computation. Thus, i is initially N/2 where N is even, and (N+1)/2 or (N−1)/2 where N is odd. Hereafter, the term "center value" will be taken to mean N/2 or (N+1)/2, depending upon whether N is even or odd, respectively. A supply control unit 14, in accordance with the tendency of a distribution (described below) of combined weight values obtained when i is the center value, sends a command to the distributing feeders 2a (FIG. 1) to instruct them as to the amount of articles to be supplied. As is known, the dispersing (distributing) feeders 22 may be constituted by a circular bowl member which has a plurality of gates on its outer circumference, and which is vibrated so that articles will be transferred radially away from the center of the bowl, or may comprise a plurality of radially arranged trough-type feeders. With the former, the supply of articles is controlled by the opening time or opening area of the gates. In the latter, the supply of articles is controlled by the duration of feeder vibration. The dispersing feeders 2a in FIG. 1 are of the latter type.

A unit 8 for computing combinations produces a signal indicative of an optimum combination, which is the result of combinatorial computation. After the combinatorial computation, the drive controller 6, in accordance with the signal from the combination computing unit 8, sends an open/close signal to the weighing hoppers 2d which participate in the optimum combination, and to the pool hoppers 2b corresponding to the selected weighing hoppers 2d. The supply control unit 14 also responds to the signal from the combination computing unit 8 by sending a supply start signal to the distributing feeders 2a corresponding to the weighing hoppers 2d participating in the optimum combination. An upper limit setting device 10 and a lower limit setting device 11 cooperate to store a desirable range of weight values, each comprising a digital switch or memory device used when obtaining the tendency of a distribution of combined weight values, as described below. A setting unit 9 is for establishing and storing the preset value mentioned above. The values stored in the units 9, 10 and 11 are applied to the combination computing unit 8 as input signals.

Figure 4:
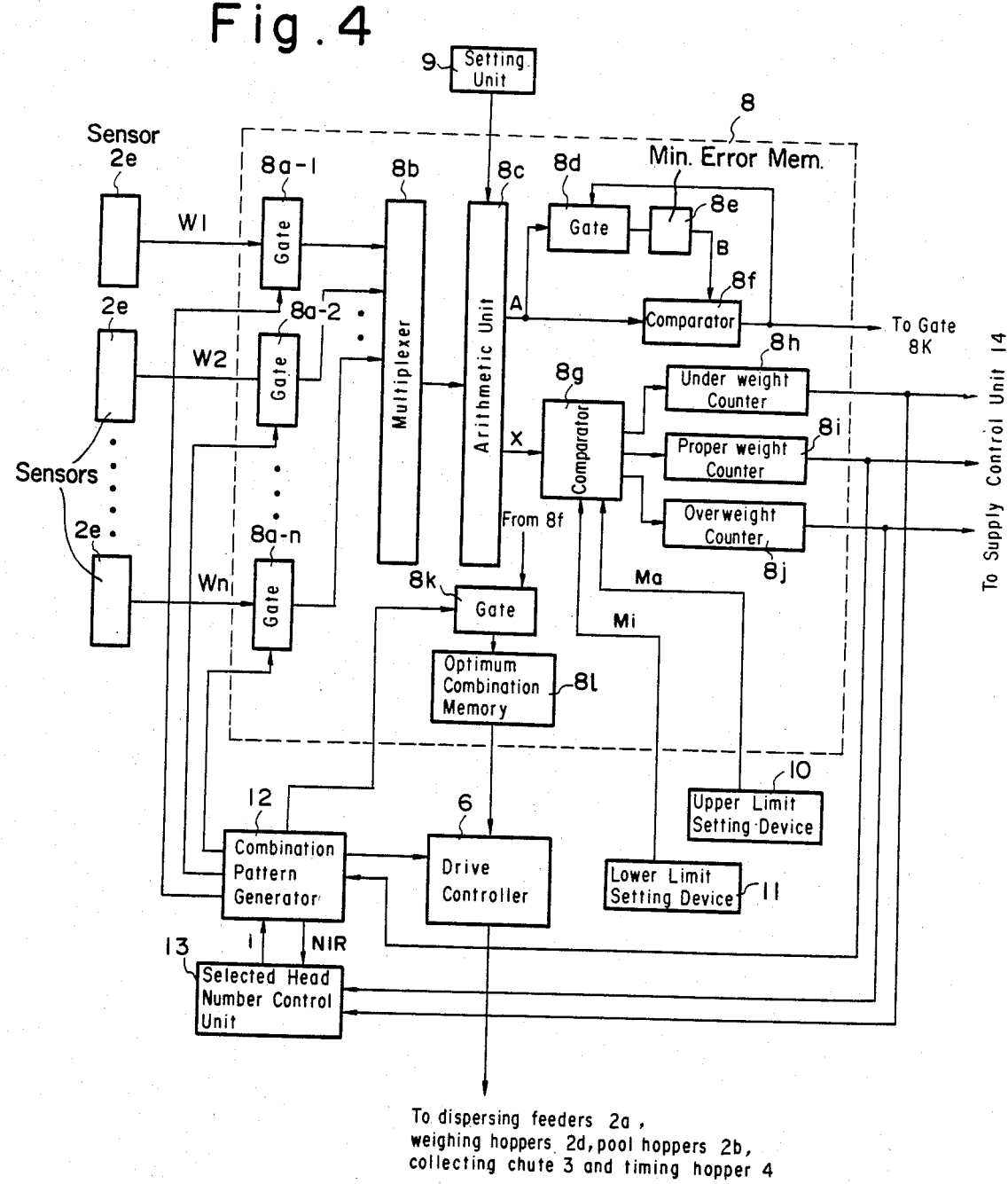
FIG. 4 is a block diagram of a combination computing unit in the apparatus of FIG. 3.

The combination computing unit 8 is shown in detail in the block diagram of FIG. 4. The unit includes gates 8a-1, 8a-2, ..., 8a-n which are interposed between the input side of a multiplexer 8b and respective weight signals W1, W2, ..., Wn from the weight sensors 2e, 2e, ..., 2e, for applying to the multiplexer 8b the weight signals from those weight sensors 2e corresponding to "1" bits in the bit signal produced by the combination pattern generator 12. Those of the weight signals W1, W2, ..., Wn which have been passed by the gates are successively delivered by the multiplexer 8b to an arithmetic unit 8c. The signals W1 through Wn are indicative of the weights measured by respective ones of the weight sensors 2e. The arithmetic unit 8c sums the weight values received from the multiplexer 8b, producing a total weight value X that is delivered to a comparator 8g, and finds the difference A between X and the contents of the setting unit 9 (see Eq. (1), these being applied to a comparator 8f and a gate 8d. The comparator 8f compares the contents B of a minimum error memory 8e with the difference A received from the arithmetic unit 8c, and delivers an enable signal to the gate 8d and to a gate 8k when A is less than B. In response to the enable signal, gate 8d opens to deliver the prevailing difference A to the minimum error memory 8e, the state of which is updated. The input to the gate 8k is a bit signal indicative of the prevailing combination pattern being generated by the combination pattern generator 12, the gate 8k responding to the above-mentioned enable signal by delivering the bit signal to an optimum combination memory 8l to update its contents. The gates 8d, 8k are both open for the initial combinatorial computation, so that the initial value of the difference A and the initial combination pattern (00 . . . 01) are stored in the minimum error memory 8e and optimum combination memory 8l, respectively.

Upper and lower limit signals Ma, Mi from the upper limit setting device 10 and lower limit setting device 11 are fed into the comparator 8g, which compares the total weight value X with these upper and lower limits to execute ranking processing (i.e., to assign X to one of three ranks), incrementing one of three counters, namely an underweight counter 8h, proper weight counter 8i and overweight counter 8j. Ranking is decided in the following manner, where X represents the total weight value, Ma the preset upper limit value, and Mi the preset lower limit value:

| | |
|---|---|
| Mi > X | X is underweight |
| Mi ≦ X ≦ Ma | X is of proper weight |
| Ma < X | X is overweight |

The selected head number control unit 13 sends a signal to the combination pattern generator 12, instructing the pattern generator of the number of weighing machines to be selected, from the total number of N weighing machines, by a combination pattern. Letting this number be i, the number of weighing machines selected will be i, which initially will be the center value defined above. The combination pattern generator, after generating patterns for all nCi weighing machines, reads in the state of the proper weight counter 8i and sends a signal to the drive controller 6 when the counter state is one or more. When the computing of combinations ends for the case where i is equal to the center value, the combination pattern generator 12 sends a signal indicative of the fact to the supply control unit 14 which, based on the contents of the rank counters 8h through 8j, alters the amount of feed of the dispersing feeders 2a when the feeders operate. The amount of feed is altered by controlling the length of time the feeder gates are open, the gate opening area, or the duration of feeder vibration.

The drive controller 6, which receives the optimum combination pattern signal from the optimum combination memory 8l, delivers the open/close signals to the weighing stations corresponding to the logical "1" bits in the received pattern.

When the state of the proper weight counter 8i is zero as the result of a combinatorial computation wherein i is the center value, the combination pattern generator 12 sends a signal NIR to the selected head number control unit 13 to request a new value of i. The selected head number control unit 13 responds by reading in the contents of the underweight counter 8i and overweight counter 8j, comparing the read values, and diminishing i when the value in the overweight counter 8j is larger, or increasing i when the value in the underweight counter 8h is larger. The method through which i is controlled will be described later.

Thus, combinations continue to be computed for each value of i, covering all 1 to N weighing machines until the state of the proper weight counter becomes one or more. If the result is that the combinations computed do not contain a combination having a total weight value within a proper weight range, the combinations are aborted, articles are resupplied to the weighing stations, and combinations are recomputed.

Figure 5:
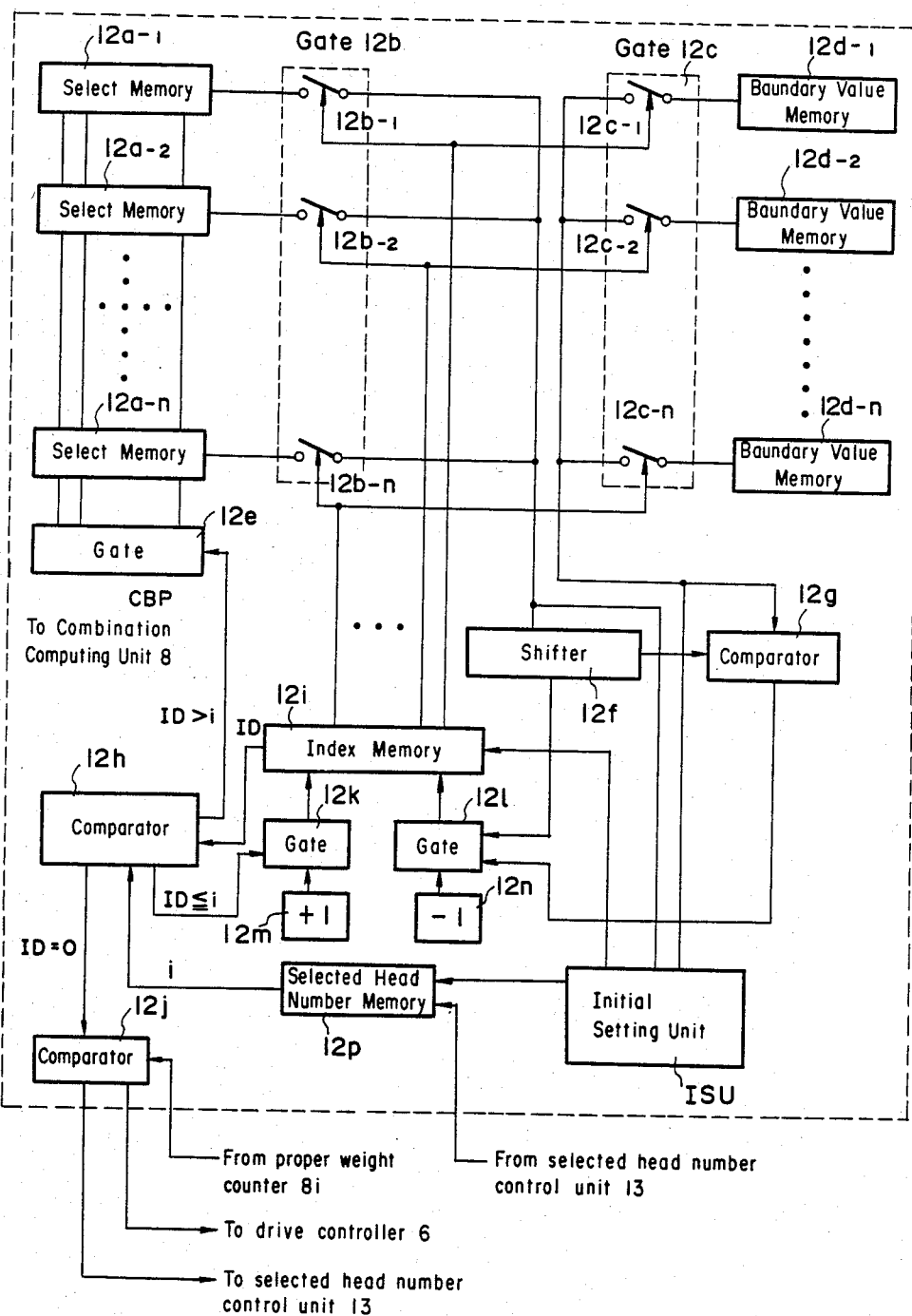
FIG. 5 is a block diagram of a combination pattern generator.

FIG. 5 is a block diagram of the details of the combination pattern generator 12. The combination pattern generator includes N-number of select memories 12a-1, 12a-2, . . . , 12a-n, each of which comprises a memory of N bits, represented by b1, b2, . . . , bn from lower to higher order. A gate 12e delivers the OR of all N of the select memories to the combination computing unit 8. The bits b1, b2, . . . , bn correspond to the gates 8a-1, 8a-2, . . . , 8a-n of the combination computing unit 8, with gate 8a-i being opened when bit bi goes to logical "1". In each of the select memories 12a-1, 12a-2, . . . , 12-n, only one of the N bits is raised to logical "1". Gates 12b-1, 12b-2, . . . , 12b-n act as N-number of normally open switches and constitute a gate 12b. The same is true of gates 12c-1, 12c-2, . . . , 12c-n, which constitute a gate 12c. In each group of these switches, one will be closed (i.e., the gate constituting the switch will be opened) in accordance with the contents of an index memory 12i. As an example, the normally open switches 12b-3 and 12c-3 will close when the state of the index memory 12d is "3". The gate (normally open switches) 12b interconnects the select memories 12a-i (i=1, 2, . . . , n) with a shifter 12f, and the gate (normally open switches) 12c connects a comparator 12g with boundary value memories 12d-1, 12d-2, . . . , 12d-n. When the state of the index memory 12i is, for example "3", the select memory 12a-3 will be connected to the shifter 12f, and the boundary value memory 12d-3 will be connected to the comparator 12g.

The boundary value memories 12d-1, 12d-2, . . . , 12d-n correspond to the select memories 12a-1, 12a-2, . . . , 12a-n, respectively, and serve to store the most significant bit position which can be raised to logical "1" among the N bits of the corresponding select memories 12a-1, 12a-2, . . . , 12a-n. For example, if the conditions are such that bits b1 through b5 are capable of being raised to logical "1" in the select memory 12a-3 but that the bits b6 through bn of memory 12a-3 are always logical "0", then the boundary value memory 12d-3 will store the value "5". The shifter 12f receives an input from whichever of the select memories 12a-1, 12a-2, . . . , 12a-n is designated by the index memory 12i, subsequently shifts the "1" bit to a higher order position, and then delivers the results to the same select memory. For example, if the input to the shifter 12f from one of the select memories is "0000010000", the shifter will shift the "1" bit to the next higher order position, producing a signal indicative of "0000100000" which is then delivered to the same select memory. The shifter 12f also performs an overflow detection function, delivering an enable signal to a gate 12l when an overflow results from the "1" shift. The comparator 12g receives, as inputs thereto, the outputs of the boundary value memories 12d-1, 12d-2, . . . , 12d-n as well as the output of the shifter 12f (namely, the data resulting from the higher order bit shift), and serves to compare the bit signal from the shifter with the input from the designated boundary value memory. If the position of the "1" bit in the signal from the shifter 12f is of a higher order than that indicated by the contents of the designated one of the boundary value memories 12d-1, 12d-2, . . . 12d-n, then the comparator 12g sends an enable signal to the gate 12l. The gate 12l performs a switching function, delivering, when enabled, a decrementing signal from a −1 generator 12n to decrement the contents of the index memory 12i. A gate 12k also performs a switching function, delivering, when enabled, an incrementing signal from a +1 generator 12m to increment the content of the index memory 12i. A comparator 12h checks the contents (counted value) ID of the index memory 12i. Specifically, the comparator 12h checks whether ID is zero, and whether ID exceeds the contents i of a selected head number memory 12p. If ID does not exceed i, i.e., when ID≦i holds, the comparator 12h *sends an enable signal to the gate 12k.* When the state of the index memory 12 is zero, the generation of combination patterns for all nCi weighing machines ends, and the comparator 12h sends a comparison command to a comparator 12j. On the other hand, when the state of the index counter 12i exceeds i (ID>i), the gate 12e is opened to deliver the OR signal of the select memories 12a-1, 12a-2,..., 12a-n to the combination computing unit 8 (FIG. 4). The data stored in the selected head number memory 12p, namely the value of i which indicates the number of weighing machines to be selected from the total number N, arrives from the selected head number control unit 13 (FIG. 4). The comparator 12j receives the signal from the comparator 12h which is generated when ID=0 holds, and responds by beginning a comparison operation in which the state of the proper weight counter 8i is read in and checked to determine if it is zero or a value of one or more. If the state of proper weight counter 8i is one or more, the comparator 12j delivers a discharge signal to the drive controller 6. When the counter state is zero, this indicates that a desirable combination is not available, in which case the comparator 12j sends a signal to the selected head number control unit 13 to request that a new value of i be produced. ISU in FIG. 5 designates an initial setting unit.

Figure 6:
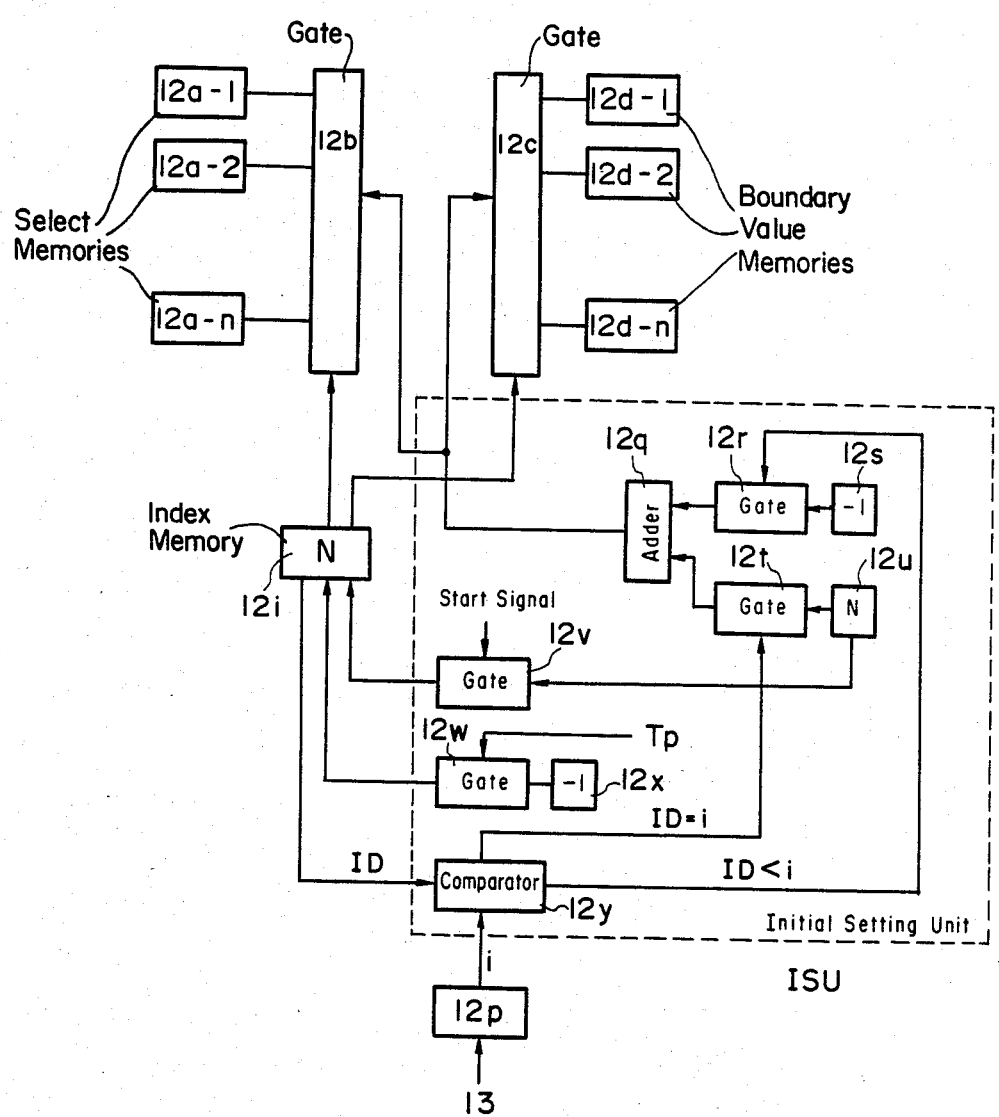
FIG. 6 is a block diagram of an initial setting unit in the combination pattern generator of FIG. 5.

The initial setting unit ISU is illustrated in detail in the block diagram of FIG. 6. The initial setting unit ISU clears the select memory 12a-i which is not used in preprocessing for the generation of combination patterns, and decides the contents of the boundary value memories 12d-1, 12d-2,..., 12d-n. When a gate 12w is opened, the state of the index memory 12i is decremented by one count (−1). An adder 12q adds the data input into it and applies the sum to the select memory and boundary value memory designated by the index memory 12i. A comparator 12y compares the state ID of the index memory 12i and the state i of the selected head number memory 12p, sending an enable signal to a gate 12t when they are equivalent or to a gate 12r when ID is smaller. The output of the adder 12q is diminished by one (−1) when the gate 12r is enabled.

Reference will now be had to FIGS. 5 and 6 to describe the operation for generating combination patterns, where the assumption will be n=10, i=5.

(A) Described first will be the initial setting operation, with reference being had to FIG. 6.

The selected head number control unit 13 produces a signal indicative of the number i (=5) of weighing machines to be selected, the signal entering the selected head number memory 12p. A start signal is applied to a gate 12v, enabling the gate so that the index memory 12i is set to N. In accordance with the state of the index memory 12i, the normally open switches 12b-n, 12c-n are closed (i.e., the gates constituting the switches are enabled), in this manner, the contents of the select memory 12a-n and boundary value memory 12d-n are cleared. The comparator 12y checks the state ID of the index memory 12i. Since ID=N, the relation ID>i will hold, so that no output emerges from the comparator 12y. The gate 12w is opened by timing pulses TP, so that the state of the index memory 12i is successively stepped down from N to N−1, N−2, N−3,..., in accordance with which the select memory 12a-i and boundary value memory 12d-i having the corresponding suffix d−i (i=N−1, N−2, N−3,...) will be cleared.

When the state ID of the index counter 12i attains the state i of the selected head number memory 12p, (that is, when ID=i holds), the comparator 12y sends an enable signal to the gate 12t, so that N is delivered as the output of the adder 12q to be set in the boundary value memory 12d-i. Next, the gate 12w is opened again, the state of the index memory 12i becomes i-1, an enable signal is applied to the gate 12r, and the boundary value memory 12d-i-1 is set to N−1. These operations continue until the state of index memory 12i is counted down to zero. Under the conditions i=5, N=10, these operations will apply 0 (zero) to the boundary value memories 12d-6 through 12d-10, and will apply 6, 7, 8, 9, 10 to the boundary value memories 12d-1, 12d-2, 12d-3, 12d-4, 12d-5, respectively.

(B) Discussed next, with reference to FIGS. 5 and 7, will be the generation of combination patterns which select i (i=5) weighing machines from a total number n (n=10) weighing machines.

When the initial setting operation ends, gate 12k is opened, setting the state of index memory 12i to "1" (one). Also, a pattern 000...01, where bit b1 is logical "1", is planted in the shifter 12f. As a result of these steps, the normally open switch 12b-1 is closed and the state of the shifter 12f is transferred to the select memory 12a-1 (FIG. 7(A)). Next, gate 12k is opened again, the state of index memory 12i becomes "2", the shifter 12f generates a pattern 00...010 in which the "1" bit position is shifted to the next higher order position, and the pattern is transferred to the select memory 12a-2. Accordingly, the bit b2 of the select memory 12a-2 is raised to logical "1" (FIG. 7(B)). These operations continue until the state of index memory 12i exceeds i. When the i-th bit bi of the select memory 12a-i becomes logical "1" and the state of the index memory 12i is, the comparator 12h detects the condition ID>i and sends an enable signal to the gate 12e. When the gate 12e opens, the combination computing unit 8 is provided with the bit pattern signal CBP (0000011111), which is obtained by taking the OR of all corresponding bits of the select memories 12a-1, 12a-2,..., 12a-n. The bit pattern signal CBP is shown in FIG. 7(E). This is the first combination pattern.

When the processing performed by the combination computing unit 8 based on the first combination pattern ends, the comparator 12g sends an enable signal to the gate 12l. The state of the index memory 12i consequently becomes i, and the shifter 12f shifts the "1" bit position, generating the pattern shown in FIG. 7(F). This pattern is then transferred to the select memory 12a-i. More specifically, the "1" logic is shifted to the i+1 position in the select memory 12a-i. Next, gate 12k is opened (ID≦i), the state of index memory is raised to i+1, and the comparator 12h issues the signal which enables the gate 12e, the latter delivering the bit pattern signal CBP, shown in FIG. 7(F), which is obtained by taking the OR of all corresponding bits of the select memories 12a-1, 12a-2,..., 12a-n. This constitutes the second combination pattern. The foregoing steps are repeated to update the bit pattern of the data memory 12*a-i* and generate the combination patterns shown in FIGS. 7(G) through 7(J). After the state of the index memory 12*i* is set to i by the signal from the comparator 12*g* and the shifter 12*f* begins to overflow (which occurs when the "1" data in bit bn is shifted), thereby sending an enable signal to the gate 12*l*, the gate 12*l* opens to decrement the state of the index counter to i-1. As a result, the previous state of the select memory 12*a-i*−1 is transferred to the shifter 12*f* (FIG. 7(K), which performs a shift based on said state. The data resulting from the shift, shown in FIG. 7(L), is transferred to the select memory 12*a-i*−1 designated by the index memory 12*i*. This is followed by opening the gate 12*k*, making ID (the state of the index memory) equal to i. The shifter 12*f* then performs a one-bit shift, sending the resulting data to the select memory 12*a-i* (FIG. 7(M)). The index memory 12*i* is incremented to i+1, at which time the combination pattern CBP shown in FIG. 7(M) is generated. The data applied to the shifter 12*f* and then shifted is constantly being compared with the data arriving from the boundary value memories 12*d*-1, 12*d*-2,..., 12*d*-n. When the "1" bit of the shifter 12*f* is of a higher order than than that of the boundary value memory, the gate 12*l* is opened as in the case of the overflow mentioned above, decrementing the state of the index memory 12*i*. Thus, combination patterns are generated one after another as the state of the index memory 12*i* is stepped down to zero. When this occurs, the comparator 12*h* sends a signal indicative of the fact to the comparator 12*j*. When the latter finds that the state of the proper weight counter is one or more, the combinatorial computations end.

Thus, summing up, data in which the bit b1 is logical "1" is applied to the select memory 12*a*-1 (FIG. 7(A)). As the state of the index memory 12*i* is successively increased, the shifter 12*f* operates and eventually provides the select memory 12*a*-5 with data wherein the bit b5 is logical "1". The state of index memory 12*i* is then raised to "6" (i.e., ID>i), so that the comparator 12*h* sends an enable signal to the gate 12*e*, which responds by delivering the first combination pattern CBP, which is shown in FIG. 7(E).

Next, the state of the index memory is stepped down to "5", and the shifter 12 shifts the former data and delivers the results to gate 12*b*. Since bit b5 was logical "1" in the previous cycle, the logical "1" bit in the delivered data is bit b6. Since the state of the index memory is "5", the data enters the select memory 12*a*-5. Gate 12*k* is then closed to raise the state of index memory 12*i* to "6", then the second combination pattern is delivered. In this fashion, combination patterns are delivered one after another, each combination differing due to the renewed state solely of the select memory 12*a*-5, the contents of the select memories 12*a*-1 through 12*a*-4 being unchanged. Combination patterns up to 100001111 are delivered.

The state of the index memory 12*i* returns subsequently to "5", and the shifter 12*f* shifts the data 1000000000, producing an overflow and sending the enable signal to the gate 12*l*. This diminishes the state of the index counter 12*i* to "4", closing the switch 12*b*-4 (i.e., opening the gate constituting the switch) so that the date in the select memory 12*a*-4 is applied to the shifter 12*f* (FIG. 7(K)). The shifter then applies a one-bit shift to this data and sends the results back to the select memory 12*a*-4, so that the contents thereof will be data 0000010000, where bit b5 is logical "1" (FIG. 7(L)). Gate 12*k* is opened, index memory 12*i* is incremented to "5", and data 0000100000, in which bit b6 is "1", is delivered to the select memory 12*a*-5 (FIG. 7(M)). Gate 12*k* is opened, incrementing the state of index counter 12*i* to "6", then the combination pattern 0000110111 shown in FIG. 7(M) is delivered. Succeeding combination patterns similarly indicated by CBS in FIGS. 7(N) through 7Q) are delivered, these differing due to the updated state solely of select memory 12*a*-5. Then, the "1" bit position of the select memory 12*a*-4 is shifted step by step to each higher order position, during which time a combination pattern is delivered with each shift until the state of the select memory 12*a*-5 reaches 1000000000 (CBS in FIGS. 7(R) through (Z). It should be noted that FIGS. 7(R) through 7(T) indicate processing similar to that shown by FIGS. 7(K) through 7(M).

Figure 7:
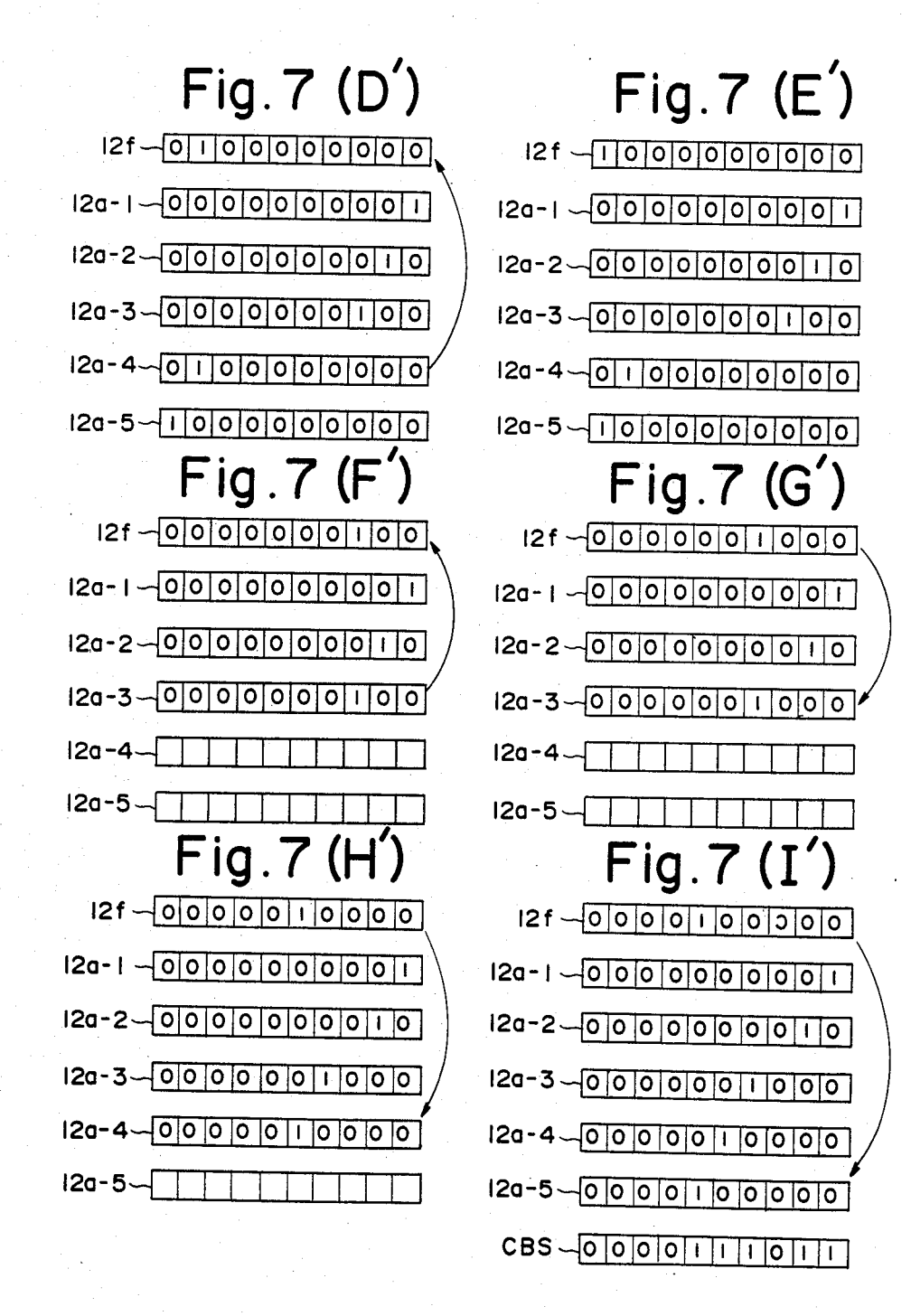

Upon generation of the combination pattern having logical "1" in the ninth bit b9 of the select memory 12*a*-4 (THE PATTERN CBS in FIG. 7(C'), the comparator 12*g* issues an enable signal which opens the gate 12*l*, whereby the state ID of the index memory 12*i* is reduced to "5". As a result, the state 1000000000 of the select memory 12*a*-5 enters the shifter 12*f*, which responds by applying a one-bit shift. Owing to the shift, an overflow occurs and reopens the gate 12*l*, diminishing the state of index counter 12*i* to "4". Accordingly, the state 0100000000 of the select memory 12*a*-4 is transferred to the shifter 12*f* (FIG. 7(D')), which performs a one-bit shift to yield the data shown in FIG. 7(E'), in which the "1" bit is the tenth bit b10. Since this has a higher order position than the ninth bit position, the comparator 12*g* sends an enable signal to the gate 12*l*. Now the state of index memory 12*i* is decremented to "3", at which time the data in the select memory 12*a*-3 is transferred to the shifter 12*f*, the state of which becomes 0000000100 (FIG. 7(F')). The shifter 12*f* shifts the data one bit to the left, transferring the results, namely 0000001000, to the select memory 12*a*-3, which is designated bby the state (ID=3) of the index memory 12*i* (FIG. 7(G')). Thereafter, the gate 12*k* is opened, the state of index memory 12*i* is raised to "4", and shifter 12*f* executes a one-bit shift to the left. The resulting data, namely 0000010000, is stored in the select memory 12*a*-4, which is designated by the index memory 12*i* (FIG. 7(H')). Then, in the fashion described above, gate 12*k* is opened, the state of index memory 12*i* is raised to "5", shifter 12*f* executes a one-bit shift to the left, and the resulting data 0000100000 is transferred to the select memory 12*a*-5 (FIG. 7(I')). After the transfer, gate 12*k* is opened to increment the state ID index memory 12*i* to "6". This establishes the condition ID>i, so that the gate 12*e* delivers the combination pattern CBS shown in FIG. 7(I'). By repeating the foregoing steps, the condition ID=0 will be established, at which time computations for obtaining all combinations which select five of the ten weighing machines will end.

Figure 8:
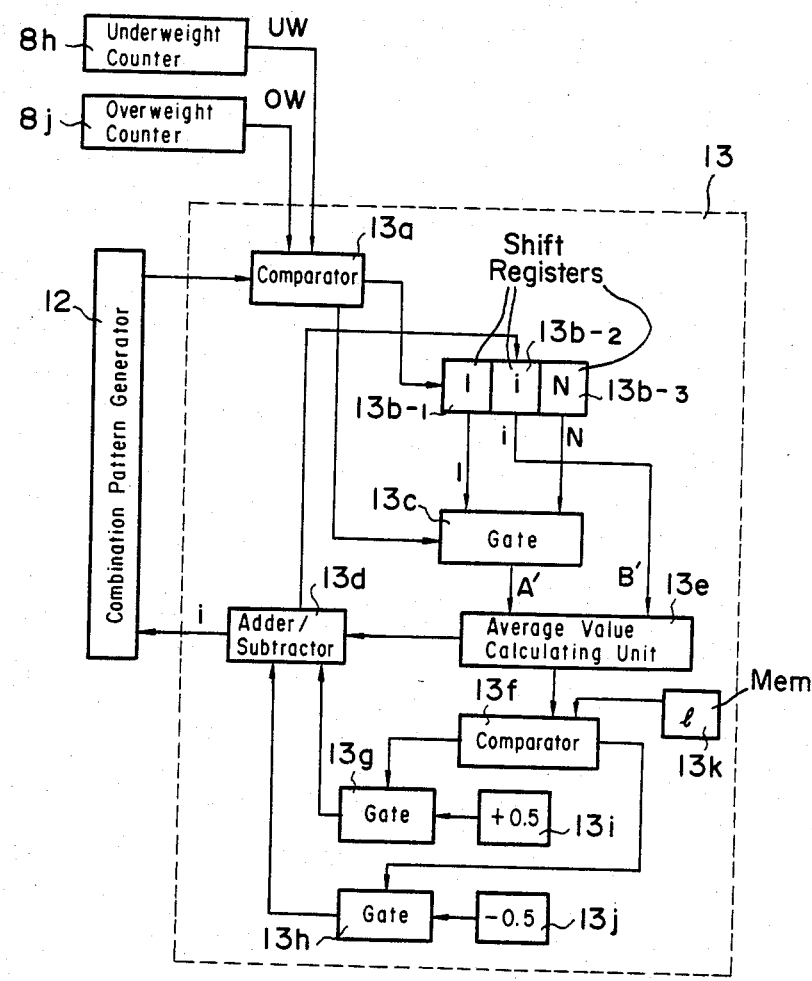
FIG. 8 is a block diagram of a selected head number control unit in the apparatus of FIG. 3.

An embodiment of the selected head number control unit 13 is illustrated in the block diagram of FIG. 8. The unit includes shift registers 13*b*-1, 13*b*-2, 13*b*-3 having three memory frames. A new item of data enters from the center, and the contents are shifted to the left or right. Whether the data is shifted to the right or left is decided by a comparator 13*a*. The latter, in response to a signal from the combination pattern generator 12, compares the state UW of the underweight counter 8*h* and the state OW of the overweight counter 8*j*, and produces a right-shift signal when OW>UW holds. A gate 13c functions as a switch to provide an average value calculating unit 13e with an input from either shift register 13b-1 or shift register 13b-3. The comparator 13a, upon finding that the state OW of the overweight counter 8j is of a value greater than the state UW of the underweight counter 8h (i.e., OW>UW), delivers a signal to the gate 13c to open the gate with respect to the shift register 13b-1. The average value calculating unit 13e calculates (A'+B')/2, namely the average value of data A' received through the date 13c and the contents B' of the register 13b-2. If the calculated value has a fraction of 0.5, a comparator 13f compares the value with the center value. If the calculated value is larger than the center value, the comparator 13f opens a gate 13h; if the calculated value is smaller, then the comparator opens a gate 13g. Numeral 13k denotes a memory for storing the center value.

The selected head number control unit 13 operates in the following manner. First, as initial values, a numerical value "1", the center value i and the number of weighing machines N are applied to the registers 13b-1, 13b-2 and 13-l 3, respectively. The center value i enters an adder/subtractor 13d, when i is delivered to the combination pattern generator 12. Thus, i is delivered as the initial selected head number. Now assume that a desirable combination does not exist among the nCi number of combinations, so that the state of the proper weight counter 8i (FIG. 4) is zero. The combination pattern generator 12 will therefore send the comparator 13a a signal requesting the next selected head number. The comparator 13a then compares the states UW, OW of the respective underweight and overweight counters 8h, 8j, issuing a signal which opens the gate 13c to the shift register 13b-1 when the inequality OW>LW holds. Otherwise (i.e., when OW<LW holds), gate 13c is opened to the shift register 13b-3. The average value calculating unit 13e calculates the average value of A', which arrives via the gate 13c, and B' (=i), which is the data in the shift register 13b-2, and delivers the result to the adder/subtractor 13d. The comparator 13f checks whether the calculated average value contains a fraction and, if it does, opens either gate 13g or 13h so that the adder/subtractor will produce a value close to i. The value thus obtained in the adder 13d will be the second selected head number.

The above value, besides entering the combination pattern generator 12, is also delivered from the adder/subtractor 13d to the shift register 13b-2, in which a shift takes place as decided by the comparator 13a. In this manner, selected head numbers are produced one after another. This will be described for a case where N=10.

Initially, the values applied to the shift register 13b-1, 13b-2, 13b-3 are "1", "5" and "10", respectively. The first output delivered is "5". Let us assume that a desirable combination does not exist among the combinations made up of five weighing machines each, so that a request for the next selected head number arrives from the combination pattern generator 12. In such case, the comparator 13a responds by comparing the contents of the underweight counter 8h and overweight counter 8j. Let the value OW in the overweight counter 8j be greater than the value UW in the underweight counter 8h (i.e., OW>UW). The values "5" and "1" will therefore be the inputs to the average value calculating unit 13e. Since the calculated average value will be "3", this is the value applied to the adder/subtractor 13d. This value enters the shift register 13b-2 and a shift to the right is performed, so that the values in shift registers 13b-1, 13b-2, 13b-3 are now "1", "3", "5", respectively. The value "3" is delivered from the adder/subtractor 13d to the combination pattern generator 12. If a desirable combination does not exist among the combinations made up of three weighing machines each, the combination pattern generator 12 requests delivery of the next selected head number. If we now assume that the inequality OW<UW holds, the gate 13c will be opened with respect to the shift register 13b-3, so that the average value calculating unit 13e performs the calculation: (5+3)/2, delivering the results "4" to the combination pattern generator 12. These operations are carried out until the proper weight counter 8i (FIG. 4) counts to one or more.

The invention is not limited to the foregoing embodiment but can be modified in various ways. For example. in the embodiment of the combination pattern generator 12, the combination patterns are produced by computation. It is possible, however, to provide an N-bit memory and store the proper number of combinations patterns for each selected head number. Also, in the illustrated embodiment, the sequence for updating the selected head number is determined by selection from among the center of the remaining numbers. A simpler updating method is possible, however, wherein the preceding selected head number is diminished by one when the value in the overweight counter is greater than that in the underweight counter.

A second embodiment of the present invention will now be described with reference to FIGS. 9 through 11. Discussed first will be the general features of the second embodiment.

Assume that a combinatorial weighing apparatus has N-number of weighing machines, that each weighing machine is supplied with a batch of articles of weight Wi (i=1, 2, ..., N), and that the set weight value is Wa. In such case, the means weight Wm of the articles delivered to each weighing machine will be given by the following:

$$Wm = \left( \sum_{i=1}^{N} Wi \right) / N \tag{4}$$

and there is a very high probability that the number of weighing machines giving the set target weight Wa will be in the neighborhood of Wa/Wm. Therefore, according to the present invention, prior to starting combinatorial computations, Wa/Wm is computed, and the resulting value following rounding off is regarded as the number of weighing machines, represented by j, giving the optimum combination. Then, combinations which selected the j-number of weighing machines from the N-number of weighing machines are generated in continuous fashion and, after all combinations made up of the j-number of weighing machines are generated, the articles are discharged from those weighing machines that give a total weight value closest to the set value within preset allowable limits. If an optimum combination within the present allowable limits does not exist among these combinations which selected the j-number of weighing machines, then each combination giving a total weight outside the preset limits on the high side (overweight) is counted, as is each combination giving a total weight outside the preset limits on the low side (underweight), providing in this matter a counted value OW representing the number of overweight combinations, and a counted value UW representing the number of underweight combinations. When the inequality OW>UW holds, j-1 is taken as the number of weighing machines giving the optimum combination. When OW<UW holds, j+1 is taken as the number of weighing machines giving the optimum combination. By re-computing combinations based on these numbers, an optimum combination within the preset allowable limits will be obtained.

Figure 9:
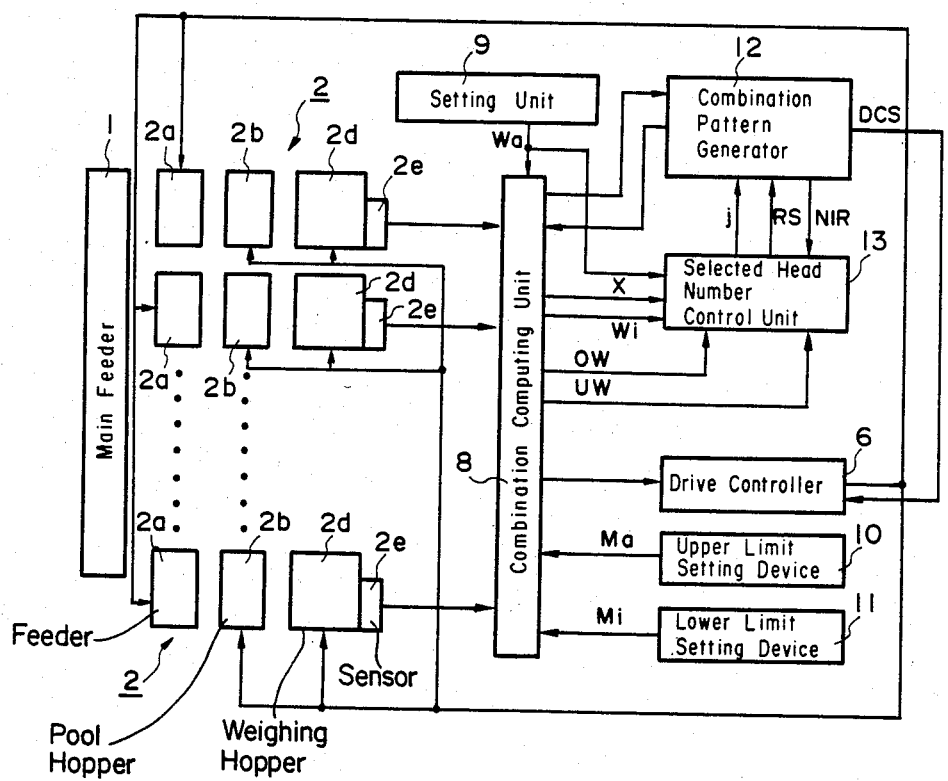
FIG. 9 is a simplified block diagram of another embodiment of a combinatorial weighing apparatus for practicing a combinatorial weighing method according to the present invention.

Reference will now be had to the block diagram of FIG. 9, which illustrates a second embodiment of a combinatorial apparatus according to the present invention. Portions similar to those of FIG. 3 are designated by like reference characters.

In FIG. 9, the combination pattern generator 12, in accordance with a request signal RS from the selected head number (weighing machine number) control unit 13, produces an all "1s" bit pattern and, in accordance with a signal specifying the j-number of weighing machines to be selected from the total of N weighing machines, produces a bit signal in which only the j-number of bits, from among the number N thereof, are raised to logical "1". The value of j is given by the following equation, followed by rounding off, and shall be referred to as the "preferential combination number":

$$j = Wa / \left( \sum_{i=1}^{N} Wi/N \right) \quad (5)$$

The value of j is varied in accordance with the results of combinatorial computations. The combination computing unit 8 produces a signal indicative of an optimum combination, which is the result of combinatorial computation. After the combinatorial computation, the drive controller 6, in accordance with the signal from the combination computing unit 8, sends an open/close signal to the weighing hoppers 2d which participate in the optimum combination, the open/close signal being applied at a staggered timing, and to the pool hoppers 2b corresponding to said weighing hoppers 2d. The supply control unit 14 also responds to the signal from the combination computing unit 8 by sending a supply start signal to the distributing feeders 2a corresponding to the weighing hoppers 2d participating in the optimum combination.

Figure 10:
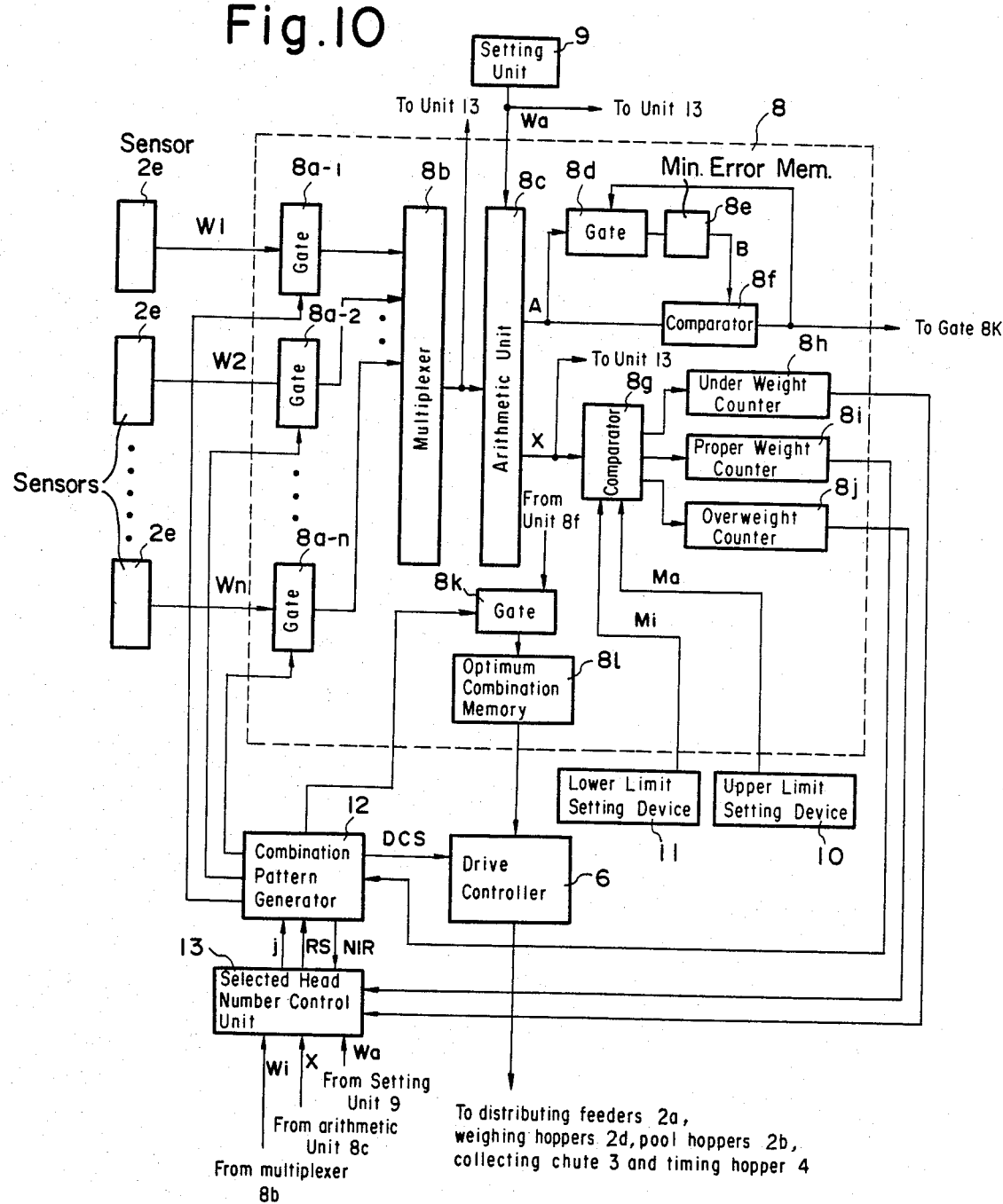
FIG. 10 is a block diagram of a combination computing unit in the apparatus of FIG. 9.
Figure 11:
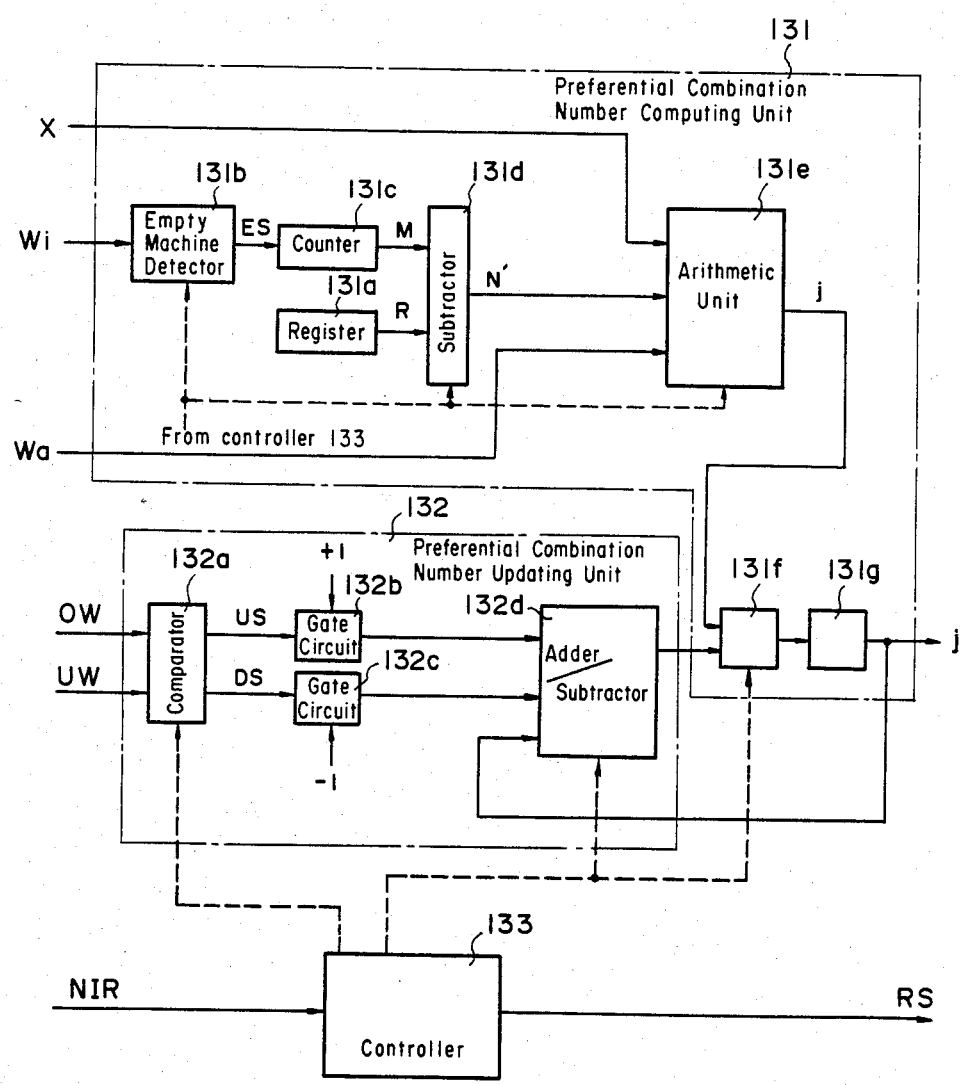
FIG. 11 is a block diagram of a selected head number control unit according to the present invention.

FIG. 10 is a block diagram of the combination computing unit. Portions and operations similar to those associated with FIG. 4 will not be described again to avoid prolixity. The selected head number control unit 13 sends a signal to the combination pattern generator 12, instructing the pattern generator of the number of weighing machines to be selected, from the total number of N weighing machines, by a combination pattern. As shown in FIG. 11, the selected head number control unit 12 includes a preferential combination number computing unit 131, a preferential combination number updating unit 132, and a control unit 133. The preferential combination computing unit 131 has a register 131a in which the number R of weighing machines is set (R ordinarily is the total number N of weighing machines, but is not fixed as the number of machines may diminish due to malfunction), and an empty machine detector 131b which monitors the weight values Wi (i=1, 2, ... , N) delivered by the multiplexer 8b to detect whether the weighing machines have been supplied with articles, and produces an "empty" signal ES when a machine has not been provided with articles (as during a zero correction or for some other reason). A counter 131c counts the number of times the empty signal ES is generated and produces an output signal M indicative of the number of unsupplied weighing machines. A subtractor 131d performs the arithmetic operation given by:

$$N' = R - M \quad (6)$$

for computing the number N' of weighing machines supplied with articles, an arithmetic unit 131e which computes the preferential combination number j by performing the operation of Eq. (5) using the total weight value $$X \left( = \sum_{i=1}^{N} Wi \right)$$

of articles introduce into all of the weighing machines (X being obtained from the arithmetic unit 8c in FIG. 10), N', as well as the set value Wa. A gate 131f and a register 131g for storing the preferential combination number j, are also included in the preferential combination number computing unit 131.

The preferential combination number updating unit 132 is provided for updating the preferential combination number when an optimum combination within preset allowable limits does not exist among the combinations which select the j-number of weighing machines from the number N' thereof. The updating unit 132 includes a comparator 132a which, when an optimum combination does not exist, compares the overweight count OW in overweight counter 8j and the underweight count in underweight counter UW, for producing an "up" signal US when OW≦UW holds and "down" signal DS when OW>UW holds. A gate circuit 132b produces the numerical value "+1" when the up signal US (logical "1") is produced, and a gate circuit 132c produces a numerical value "−1" when the down signal DS (logical "1") is produced. An adder/subtractor 132d performs the operation j+1 or j−1 using the preceding preferential combination number j stored in the register 131g, as well as the outputs of the gate circuits 132b, 132c, and applies the results of the above operation to the register 131g through the gate 131f to update the state of the register 131g.

In the operation of this second embodiment of present invention, the controller 133 of the selected head number control unit 13 (FIG. 11) is operable, prior to the start of combinatorial computations, to provide the combination pattern generator 12 with the request signal RS so that the generator will produce an all "1's" bit pattern (111 . . . 11). The multiplexer 8b, which as a result of the bit pattern receives the weight value signals W1, W2, . . . , Wn via the gates 8a-1, 8a-2, . . . , 8a-n, delivers these signals to the arithmetic unit 8c and to the empty machine detector 131b of the selected head number control unit 13. The arithmetic unit 8c computes the total weight X (=Wi) of articles supplied to all weighing machines, and applies the results to the arithmetic unit 131e. The adder/subtractor 131d obtains, from Eq. (6), the number N' of weighing machines supplied with articles, and applies this value to the arithmetic unit 131e. The latter, using X, N' and Wa, performs the operation of Eq. (5) and sets the results, namely j, in the register 131g. The value j is also delivered to the combination pattern generator 12 as the preferential combination number. Thereafter, the combination pattern generator 12 successively produces bit patterns of all $_{N'}C_j$ combinations which select j-number of weighing machines from the N'-number of weighing machines, and the combination computing unit 8 starts computing combinations in the manner described earlier. When the combination computing unit 8 finishes producing all $_{N'}C_j$ patterns, that is, when the computing unit 8 ends the combinatorial computations for all $_{N'}C_j$ combinations which select the j-number of weighing machines from the number N' of weighing machines, the combination pattern generator 12 reads in the state of the proper weight counter 8i and, when the state of the counter is one or more, sends a discharge signal DCS to the drive controller 6, by which article discharge and supply are controlled. More specifically, upon receiving the discharge signal DCS, the drive controller 6 sends an enable signal to those weighing hopper gates corresponding to the "1" bits of the optimum combination pattern stored in the optimum combination pattern memory 81, causing the selected weighing machines to discharge their articles into the collecting chute, and then sends an enable signal to those pool hopper gates which correspond to the "1" bits of the optimum combination pattern, so that the articles retained by the pool hoppers will be discharged into the weighing machines. Further, the drive controller 6 controls the distributing feeders which correspond to the "1" bits of the optimum combination pattern, whereby the emptied pool hoppers are supplied with articles.

When the state of the proper weight counter 8i is zero as a result of the combinatorial computations based on the preferential combination number j, the combination pattern generator 12 sends the request signal NIR to the selected head number control unit 13 to request a new value for j. The comparator 132a of the selected head control unit 13, in response to a command from the controller 133, reads in and compares the values OW, UW from the underweight counter 8h and overweight counter 8j. When OW is larger, j is diminished by one. In other cases, j will be increased by one. More specifically, the adder/subtractor 132d performs the computation j−1 when OW>LW holds, or the computation j+1 when OW≦LW holds, stores the results in the register 131g and delivers the results to the combination pattern generator 12. Consequently, the combination pattern generator 12 successively generates bit patterns for all N'C$_{j+1}$ or N'C$_{j-1}$ combinations, which select j+1 or j−1 weighing machines from N' weighing machines, respectively. The combination computing unit 8 proceeds to perform combinatorial computations as described earlier.

Thus, combinations continue to be computed for each value of j, and all 1 to N' weighing machines are covered until the state of the proper weight counter becomes "1" or more. If the result is that the combinations computed do not contain a combination having a total weight value within a proper weight range, the combinations are aborted, articles are resupplied to the weighing stations, and combinations are recomputed.

The present invention is not limited to the embodiment just described. For example, in the foregoing, it was assumed that some weighing machines may not be supplied with articles. If it is certain that all weighing machines will be supplied, then the empty machine detector 131b, counter 131c and subtractor 131d in the selected head number control unit 13 can be omitted. Furthermore, while the embodiments have been illustrated in terms of single-function hardware, the invention can be implemented by software as well.

According to the present invention, combinations of the articles are obtained within the desired limits without requiring the computation of all $2^n - 1$ combinations. In other words, combinations within desired limits are obtained through only a small number of computations. This reduces the time needed for these computations so that weighing can proceed at high speed. In addition, for each total weight value of a certain combination that is obtained, the value is ranked as being underweight, proper or overweight, and the weight values are counted rank by rank. If an optimum combination does not exist in the combinations made up of the initial selected number of heads, then, based on the counted value in each rank, the selected head number is updated and an optimum combination pattern is reselected. The quantity of articles supplied to the weighing hoppers is controlled based on the counted value in each rank. The combinatorial weighing method of the present invention therefore performs highly accurate combinatorial weighing through only a small number of combinatorial computations.

Further, according to the present invention, in the event that an optimum combination does not exist among the combinations which select j weighing machines from the N-number of weighing machines, j is updated to j+1 or j−1, depending upon the magnitudes of the overweight and underweight counts. Therefore, even if an optimum combination is not found among the combinations which select j weighing machines, an optimum combination can still be obtained in a short period of time.

As many apparently widely different embodiments of the present invention can be made without departing from the spirit and scope of the present invention, it is to be understood that the invention is not limited to the specific embodiments of the present invention except as defined in the appended claims.

What we claim is:

1. A combinatorial weighing method in which weight data from N weighing machines (where N is an integer) containing articles are combined to obtain an optimum combination of weighing machines having a total combined weight value of articles equal to a preset value Wa or closest to the preset value Wa within preset allowable limits, the articles being discharged from the obtained optimum combination of weighing machines, comprising the steps of:
   (a) forming combinations of i weighing machines from among the N weighing machines, where i is a specific number of weighing machines which tends to afford the optimum combination more readily than other numbers of the weighing machines, and where i is an integer less than N;
   (b) generating continuously only combinations which select i weighing machines from among the N weighing machines;
   (c) determining whether the total weight value of each combination composed of the i weighing machines falls within the preset allowable limits;
   (d) assigning the total weight of each of the combinations generated to one of an overweight rank which is outside the preset allowable limits on the high side, a proper weight rank which is within the preset allowable limits, and an underweight rank which is outside the preset allowable limits on the low side;

(e) counting the occurrence of weight values in each of the overweight, proper weight and underweight ranks;
(f) storing an optimum combination which is within the preset allowable limits; and
(g) discharging articles based on the stored optimum combination from among all combinations composed of i weighing machines.

2. The combinatorial weighing method according to claim 1, further comprising the step of setting the initial value of i to N/2 when N is even, and to (N/2)±0.5 when N is odd.

3. The combinatorial weighing method according to claim 1, further comprising the step of setting the initial i to a value computed from the following:

$$i = Wa / \left( \sum_{i=1}^{N} Wi/N \right),$$

where Wi (i=1, 2, ..., N) represents the weight of article batches supplied to each of the weighing machines.

4. The combinatorial weighing method according to claim 1, further comprising the steps of:
(h) comparing the magnitudes of the overweight count and the underweight count when the proper weight count is zero;
(i) updating the initial value of i by decreasing the number of weighing machines in the combinations generated in said step (b) when the overweight count is greater than the underweight count and increasing the number of weighing machines in the combinations generated in said step (b) when the overweight count is less than the underweight count, and reselecting an optimum combination composed of the updated number of weighing machines; and
(j) repeating the updating of i and the selection of an optimum combination based on the updated i, within the preset allowable limits, until an optimum combination is found.

5. The combinatorial weighing method according to claim 1, further comprising the step of controlling an amount of articles to be supplied to each of the weighing machines based on the overweight, underweight and proper weight counts, which are obtained after all combinations composed of the selected i weighing machines have been computed in said step (c).

6. A combinatorial weighing apparatus in which weight data from N weighing machines (where N is an integer) containing articles are combined to obtain an optimum combination of weighing machines having a total combined weight value of articles equal to a preset value Wa or closest to the preset value Wa within preset allowable limits, the articles being discharged from the obtained optimum combination of weighing machines, said apparatus comprising:
means for selecting i weighing machines from among the N weighing machines (where i is an integer less than N), and for continuously generating only combinations composed of i weighing machines;
comparison means for determining whether the total weight value of each combination of i weighing machines falls within the preset allowable limits, said comparison means including means for assigning the total weight of each combination generated to an overweight rank which is outside the preset allowable limits on the high side, to a proper weight rank which is within the preset allowable limits, or to an underweight rank which is outside the preset allowable limits on the low side;
an overweight counter, operatively connected to said comparison means, for counting the occurrence of weight values in the overweight rank;
a proper weight counter, operatively connected to said comparison means, for counting the occurrence of weight values in the proper weight rank;
an underweight counter, operatively connected to said comparison means, for counting the occurrence of weight values in the underweight rank;
a memory, operatively connected to said selecting means, for storing an optimum combination which is within the preset allowable limits; and
means for discharging articles based on the stored optimum combination from among all combinations composed of i weighing machines.

7. The apparatus according to claim 6, further comprising:
means for comparing the magnitudes of the overweight count and the underweight count when the proper weight count is zero;
means for updating i, based on the results of the comparison, by decreasing i when the overweight count is greater than the underweight count, and increasing i when the overweight count is less than the underweight count; and
means for reselecting an optimum combination based on the updated value of i, said updating means and said reselecting means repeating the updating and reselecting operations until the proper weight count becomes one or more.

8. The apparatus according to claim 6, wherein said selecting means includes means for computing combinations with N/2 as the initial value of i when N is even, and with (N/2)±0.5 as the initial value of i when N is odd, further comprising supply control means for controlling the amount of articles supplied to each of the weighing machines based on the overweight, underweight and proper weight counts, which are obtained after all combinations composed of the selected i weighing machines have been computed.

9. The apparatus according to claim 6, further comprising means for setting the initial value of i to a value computed from the following:

$$i = Wa / \left( \sum_{i=1}^{N} Wi/N \right),$$

where Wi (i=1, 2, ..., N) represents the weight of article batches supplied to each of the weighing machines.

10. A combinatorial weighing method for measuring out a collection of articles, comprising the steps of:
(a) providing N batches of articles, each of which has a corresponding batch weight value, where N is an integer;
(b) setting a number of batches i which are to take part in combinatorial computation, where i is an integer less than N;
(c) generating, for all of the N batches of articles, only combinations of the batches of articles which include i batches of articles from among the N batches of articles;

(d) determining, for each of the combinations generated in said step (c), whether the total weight of the combination of i batches of articles is greater than, less than or within preset allowable limits, and assigning each of the combinations an overweight rank if the total weight is greater than the preset allowable limits, an underweight rank if the total weight is less than the preset allowable limits, and a proper weight rank if the total weight is within the preset allowable limits;

(e) counting the occurrence of the combinations having total weights which are within each of the overweight, proper weight and underweight ranks;

(f) updating the number i of batches of articles which are to take part in the combinatorial computation when it is determined in said counting step (e) that there are no combinations within the proper weight rank; and (g) selecting an optimum combination of i batches of articles for discharge if at least one of the combinations is within the proper weight rank;

(h) discharging the batches of articles corresponding to the selected optimum combination of i batches of articles selected when an optimum combination is selected in said step (g);

(i) repeating said steps (c) through (h) until an optimum combination within the preset allowable limits is discharged in said step (h).

11. The method according to claim 10, further comprising the steps of:

supplying an amount of articles to form each of the batches of articles; and controlling the supply of articles forming each of the batches of articles based on the overweight, underweight and proper weight counts determined in said step (e).

12. The method according to claim 11, wherein said updating step (f) comprises:

(f') comparing the magnitudes of the overweight count and the underweight count when the proper weight count is zero; and (f'') updating i by decreasing the number of batches of articles forming the combinations which take part in the combinatorial computation when the overweight count is greater than the underweight count, and increasing the number of batches of articles forming the combinations which take part in the combinatorial computation when the overweight count is less than the underweight count.

13. The method according to claim 12, wherein said setting step (b) comprises the step of setting i to $N/2$ when N is even, and to $(N/2)\pm 0.5$ when N is odd.

14. The method according to claim 13, wherein said setting step (b) comprises the step of setting i to a value computed from the following:

$$i = W_a / \left( \sum_{i=1}^{N} W_i / N \right) ,$$

where $W_i$ ($i=1, 2, \ldots, N$) represents the weight of each of the batches of articles.

15. The method according to claim 10, wherein said updating step (f) comprises:

(f') comparing the magnitudes of the overweight count and the underweight count when the proper weight count is zero; and (f'') updating i by decreasing the number of batches of articles forming the combinations which take part in the combinatorial computation when the overweight count is greater than the underweight count, and increasing the number of batches of articles forming the combinations which take part in the combinatorial computation when the overweight count is less than the underweight count.

16. The method according to claim 15, wherein said setting step (b) comprises the step of setting i to $N/2$ when N is even, and to $(N/2)\pm 0.5$ when N is odd.

17. The method according to claim 15, wherein said setting step (b) comprises the step of setting i to a value computed from the following:

$$i = W_a / \left( \sum_{i=1}^{N} W_i / N \right) ,$$

where $W_i$ ($i=1, 2, \ldots, N$) represents the weight of each of the batches of articles.

* * * * *

UNITED STATES PATENT AND TRADEMARK OFFICE
CERTIFICATE OF CORRECTION

PATENT NO. : 4,516,643

DATED : MAY 14, 1985

INVENTOR(S) : YUKIO NAKAGAWA

It is certified that error appears in the above-identified patent and that said Letters Patent is hereby corrected as shown below:

FRONT PAGE [57] ABSTRACT
Col. 2, line 10, delete "machine";
line 26, "suppled" should be --supplied--.

Col. 1, line 66, delete "with an";
line 67, delete "attached"; and "a" should be --with an attached--.

Col. 2, line 45, "wehn" should be --when--.

Col. 4, line 36, "hopper" should be --hopper 2d--.

Col. 6, line 1, "ech" should be --each--.

Col. 7, line 5, "odd, with the reason" should be --odd. The reason is--.

Col. 8, line 3, "(N+1)/2" should be --$(N\pm 1)/2$--;
line 10, "22" should be --2a--.

UNITED STATES PATENT AND TRADEMARK OFFICE
CERTIFICATE OF CORRECTION

PATENT NO. : 4,516,643  Page 2 of 3
DATED : MAY 14, 1985
INVENTOR(S) : YUKIO NAKAGAWA It is certified that error appears in the above-identified patent and that said Letters Patent is hereby corrected as shown below:

```
Col.  9, line  3, delete "above-";
          line  4, delete "mentioned".

Col. 12, line 44, after "is" insert --raised to i+1 after
                  bit b of memory 12a-1 becomes a
                  logical "1"--.

Col. 13, line 10, "7(K)," should be --7(K)),--.

Col. 14, line 14, "(Z)" should be --(Z))--;
          line 20, "(THE PATTERN" should be --(The
                  Pattern--; and
                  "7(C')" should be --7(C'))--;
          line 40, "bby" should be --by--.

Col. 15, line 22, "13-1 3," should be --13b-3,--.

Col. 16, line 54, "selected" should be --select--;
          line 62, "selected" should be --select--.
```

UNITED STATES PATENT AND TRADEMARK OFFICE
CERTIFICATE OF CORRECTION

PATENT NO. : 4,516,643

DATED : MAY 14, 1985

INVENTOR(S) : YUKIO NAKAGAWA

It is certified that error appears in the above-identified patent and that said Letters Patent is hereby corrected as shown below:

Col. 18, line 10, "an" should be --and an--.

Col. 21, line 14, after "initial" insert --value of--.

Col. 24, line 8, "13" should be --12--.

Signed and Sealed this

Twenty-second Day of October 1985

[SEAL]

Attest:

DONALD J. QUIGG

*Attesting Officer*

*Commissioner of Patents and Trademarks—Designate*